United States Patent
Nammi et al.

(10) Patent No.: US 10,673,575 B2
(45) Date of Patent: *Jun. 2, 2020

(54) SCHEDULING DOWNLINK DATA WITH MULTIPLE SLOT FEEDBACK CHANNEL CONFIGURATION IN WIRELESS COMMUNICATION SYSTEMS

(71) Applicant: AT&T Intellectual Property I, L.P., Atlanta, GA (US)

(72) Inventors: SaiRamesh Nammi, Austin, TX (US); Arunabha Ghosh, Austin, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/509,813

(22) Filed: Jul. 12, 2019

(65) Prior Publication Data

US 2019/0334660 A1  Oct. 31, 2019

Related U.S. Application Data

(63) Continuation of application No. 15/948,052, filed on Apr. 9, 2018, now Pat. No. 10,396,940.

(51) Int. Cl.
| | |
|---|---|
| *H04L 1/18* | (2006.01) |
| *H04W 72/04* | (2009.01) |
| *H04B 1/713* | (2011.01) |
| *H04L 5/00* | (2006.01) |
| *H04L 1/16* | (2006.01) |

(52) U.S. Cl.
CPC .......... *H04L 1/1812* (2013.01); *H04B 1/713* (2013.01); *H04L 1/1858* (2013.01); *H04L 1/1887* (2013.01); *H04L 5/0055* (2013.01); *H04W 72/0406* (2013.01); *H04L 1/1607* (2013.01)

(58) Field of Classification Search
CPC ... H04L 1/1812; H04L 1/1887; H04L 5/0055; H04L 1/1607; H04B 1/713; H04W 72/0406

See application file for complete search history.

(56) References Cited

U.S. PATENT DOCUMENTS

| | | | |
|---|---|---|---|
| 9,106,419 | B2 | 8/2015 | Chen et al. |
| 9,161,348 | B2 | 10/2015 | Papasakellariou et al. |
| 9,270,409 | B2 | 2/2016 | Eamshaw et al. |
| 9,386,594 | B2 | 7/2016 | Liu et al. |
| 9,515,781 | B2 | 12/2016 | Kim et al. |

(Continued)

OTHER PUBLICATIONS

Notice of Allowance received for U.S. Appl. No. 15/948,052 dated Apr. 15, 2019, 27 pages.

(Continued)

*Primary Examiner* — Duc C Ho
(74) *Attorney, Agent, or Firm* — Amin, Turocy & Watson, LLP

(57) ABSTRACT

The described technology is generally directed towards scheduling downlink transmissions using orthogonal resources (that is, resources that avoid or at least reduce interference) when a network configures a user equipment (UE) with a multiple slot configuration to repeat the HARQ-ACK information for a transmission. By using orthogonal resources, a downlink transmission can be scheduled in consecutive time slots instead of waiting for the repeated HARQ-ACKs to complete.

20 Claims, 14 Drawing Sheets

(56) References Cited

U.S. PATENT DOCUMENTS

| | | | |
|---|---|---|---|
| 9,667,386 B2 | 5/2017 | Li et al. | |
| 9,686,064 B2 | 6/2017 | He et al. | |
| 9,686,089 B2 | 6/2017 | He et al. | |
| 9,819,458 B2 | 11/2017 | Chen et al. | |
| 9,876,623 B2 | 1/2018 | Papasakellariou | |
| 2011/0261858 A1* | 10/2011 | Baldemair | H04J 11/0033 |
| | | | 375/130 |
| 2014/0071952 A1 | 3/2014 | Kim et al. | |
| 2016/0094314 A1 | 3/2016 | Wong et al. | |
| 2016/0285595 A1 | 9/2016 | Chen et al. | |
| 2017/0180098 A1 | 6/2017 | You et al. | |
| 2017/0195163 A1 | 7/2017 | Chae et al. | |
| 2017/0245158 A1 | 8/2017 | Xiao et al. | |
| 2017/0325218 A1 | 11/2017 | Papasakellariou et al. | |
| 2018/0019843 A1 | 1/2018 | Papasakellariou | |
| 2018/0092089 A1 | 3/2018 | Yin et al. | |
| 2018/0199359 A1 | 6/2018 | Cao et al. | |
| 2018/0287744 A1 | 10/2018 | Sundararajan et al. | |
| 2019/0082351 A1* | 3/2019 | Nammi | H04L 1/0071 |

OTHER PUBLICATIONS

International Search Report and Written Opinion received for PCT Application Serial No. PCT/US2019/025451 dated Sep. 9, 2019, 22 pages.

Huawei et al., "Discussion on subslot-SPUCCH repetition", 3GPP TSG RAN WG1 Meeting #92bis, R1-1804411, Apr. 16-20, 2018, 7 pages.

\* cited by examiner

| | Time Slot 1 | Time Slot 2 | Time Slot 3 | Time Slot 4 | Time Slot 5 | Time Slot 6 | Time Slot 7 | Time Slot 8 | |
|---|---|---|---|---|---|---|---|---|---|
| PDSCH RG-1, PUCCH RG-A | PDSCHa (-A) HARQa1: PUCCH RG-A | - HARQa2: PUCCH RG-A | - HARQa3: PUCCH RG-A | - HARQa4: PUCCH RG-A | PDSCHe (-A) HARQe1: PUCCH RG-A | - HARQe2: PUCCH RG-A | - HARQe3: PUCCH RG-A | - HARQe4: PUCCH RG-A | ... |
| PDSCH RG-2, PUCCH RG-B | | PDSCHb (-B) HARQb1: PUCCH RG-B | - HARQb2: PUCCH RG-B | - HARQb3: PUCCH RG-B | - HARQb4: PUCCH RG-B | PDSCHf (-B) HARQf1: PUCCH RG-B | - HARQf2: PUCCH RG-B | - HARQf3: PUCCH RG-B | ... |
| PDSCH RG-3, PUCCH RG-c | | | PDSCHc (-C) HARQc1: PUCCH RG-c | - HARQc2: PUCCH RG-c | - HARQc3: PUCCH RG-c | - HARQc4: PUCCH RG-c | PDSCHg (-C) HARQg1: PUCCH RG-c | - HARQg2: PUCCH RG-c | ... |
| PDSCH RG-4, PUCCH RG-D | | | | PDSCHd (-D) HARQd1: PUCCH RG-D | - HARQd2: PUCCH RG-D | - HARQd3: PUCCH RG-D | - HARQd4: PUCCH RG-D | PDSCHh (-D) HARQh1: PUCCH RG-D | ... |

| | Time Slot 1 | Time Slot 2 | Time Slot 3 | Time Slot 4 | Time Slot 5 | Time Slot 6 | Time Slot 7 | Time Slot 8 |
|---|---|---|---|---|---|---|---|---|
| PDSCH RG-1, PUCCH RG-A | PDSCHa HARQa1: PUCCH RG-A | PDSCHb HARQb1: PUCCH RG-A | PDSCHc HARQc1: PUCCH RG-A | PDSCHd HARQd1: PUCCH RG-A | PDSCHe HARQe1: PUCCH RG-A | PDSCHf HARQf1: PUCCH RG-A | PDSCHg HARQg1: PUCCH RG-A | PDSCHh HARQh1: PUCCH RG-A |
| PDSCH RG-1, PUCCH RG-B | | HARQa2: PUCCH RG-B | HARQb2: PUCCH RG-B | HARQc2: PUCCH RG-B | HARQd2: PUCCH RG-B | HARQe2: PUCCH RG-B | HARQf2: PUCCH RG-B | HARQg2: PUCCH RG-B |
| PDSCH RG-1, PUCCH RG-C | | | HARQa3: PUCCH RG-C | HARQb3: PUCCH RG-C | HARQc3: PUCCH RG-C | HARQd3: PUCCH RG-C | HARQe3: PUCCH RG-C | HARQf3: PUCCH RG-C |
| PDSCH RG-1, PUCCH RG-D | | | | HARQa4: PUCCH RG-D | HARQb4: PUCCH RG-D | HARQc4: PUCCH RG-D | HARQd4: PUCCH RG-D | HARQe4: PUCCH RG-D |

SCHEDULING DOWNLINK DATA WITH MULTIPLE SLOT FEEDBACK CHANNEL CONFIGURATION IN WIRELESS COMMUNICATION SYSTEMS

RELATED APPLICATION

The subject patent application is a continuation of, and claims priority to, U.S. patent application Ser. No. 15/948,052 (now U.S. Pat. No. 10,396,940), filed Apr. 9, 2018, and entitled "Scheduling Downlink Data with Multiple Slot feedback Channel Configuration in Wireless Communication Systems," the entirety of which application is hereby incorporated by reference herein.

TECHNICAL FIELD

The subject application is related to wireless communication systems, and, for example, to scheduling downlink data when a user equipment is configured with multiple slots for repeatedly reporting hybrid automatic repeat request-acknowledgements (HARQ-ACKs) in a wireless communication system.

BACKGROUND

In wireless communication systems, including New Radio (NR, sometimes referred to as 5G) and likely beyond, user equipment computes channel estimates based on pilot or reference signals, and computes the parameters needed for channel state information (CSI) reporting. A CSI report is sent from the user equipment to a network device via a feedback channel on request from the network, or the user equipment may be configured to send the CSI report periodically. A network scheduler uses this information in choosing the parameters for scheduling of this particular user equipment. The network sends the scheduling parameters to the user equipment in a downlink control channel. After that, actual data transfer takes place from the network to the user equipment.

When user equipment receives a packet, the user equipment returns a hybrid automatic repeat request-acknowledgement (HARQ-ACK) on the physical uplink control channel (PUCCH) to the network device/gNodeB. The gNodeB needs to correctly decode the HARQ-ACK from the PUCCH information to know whether the packet it transmitted was received correctly or not. Once the gNodeB decodes the PUCCH information, the gNodeB determines whether to retransmit the packet (if NACK) or pass it to upper layers (if ACK).

However, the PUCCH transmissions from multiple sets of user equipment increase the uplink interference level (or more specifically rise over thermal (RoT)) received in uplink at the gNodeB. This is because in uplink, each user equipment transmits on the same resources; (users are separated by non-orthogonal scrambling codes also referred to as Constant Amplitude Zero AutoCorrelation waveform or CAZAC sequences). Therefore uplink transmissions have to share interference-limited radio resources.

One way to improve PUCCH performance and thereby improve the PUCCH coverage is to repeat the HARQ-ACK transmission for each received packet, such as when a user equipment is at the cell edge, when the path loss is very high and/or when the received signal-to-noise ratio is very low. This is accomplished by the use of a HARQ-ACK repetition factor, which describes how many times the user equipment is to transmit the (same) HARQ-ACK message associated with a transport block. However when the HARQ-ACK is repeated, the network cannot schedule the user equipment in consecutive time intervals, because the user equipment will be transmitting the repeated HARQ-ACK during this next time interval; as a result, peak throughput is reduced.

BRIEF DESCRIPTION OF THE DRAWINGS

The technology described herein is illustrated by way of example and not limited in the accompanying figures in which like reference numerals indicate similar elements and in which:

FIG. 2 illustrates an example of communicating PDSCH downlink transmissions and associated PUCCH HARQ-ACK responses with a repetition factor of four, in which PUCCH resources remain the same for a given transmission's HARQ-ACKs, in accordance with various aspects and implementations of the subject disclosure.

FIG. 4 illustrates an example of communicating PDSCH downlink transmissions and associated PUCCH HARQ-ACK responses with a repetition factor of four, in which PUCCH resources change for a given transmission's HARQ-ACKs, in accordance with various aspects and implementations of the subject disclosure.

DETAILED DESCRIPTION

Figure 1:
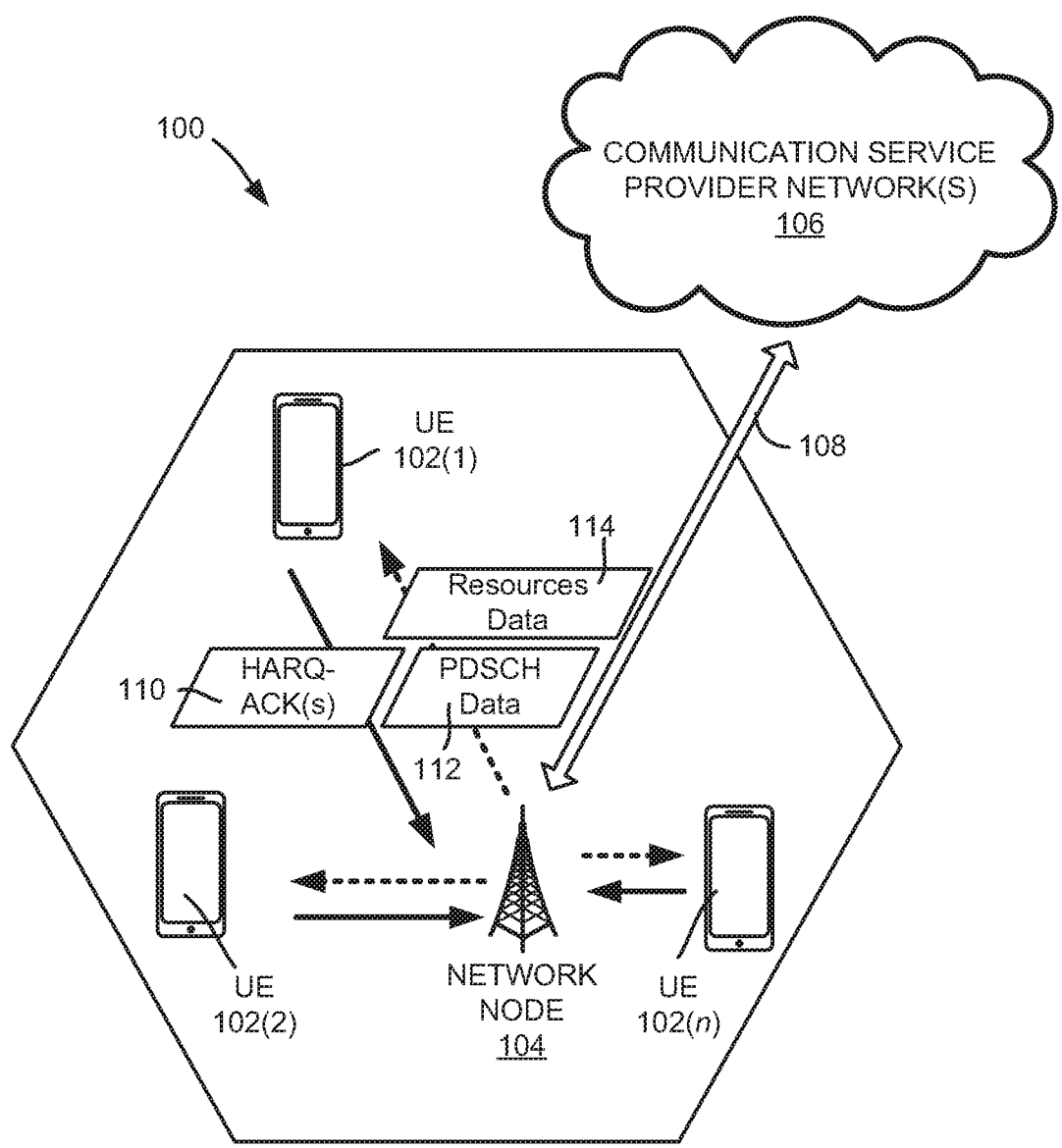
FIG. 1 illustrates an example wireless communication system in which a network node device (e.g., network node) and user equipment (UE) can implement various aspects and implementations of the subject disclosure.

Briefly, one or more aspects of the technology described herein are generally directed towards scheduling downlink transmissions using orthogonal resources (that is, resources that avoid or at least reduce interference) when a network (alternatively referred to herein as a "network node" or "network device") configures a user equipment (UE) to repeat the HARQ-ACK information for a transmission; (that is, the user equipment is configured in a "multi-slot" configuration). By using orthogonal resources, a downlink transmission can be scheduled in consecutive time slots instead of waiting for repeated HARQ-ACKs that use those consecutive time slots and thus interfere if non-orthogonal resources are used.

By way of example, consider that the repetition factor is two for a certain user equipment, because the coverage of new radio is improved by repeating the HARQ-ACK information given that certain user equipment's current signal conditions. When non-orthogonal resources are used, a solution is for the network to simply not schedule downlink transmissions to the user equipment in consecutive time intervals; more particularly, if the network schedules the equipment with a physical downlink shared channel (PDSCH) at time interval T1, then the network cannot schedule the LIE with another PDSCH at T1+1 because the equipment needs to transmit the HARQ-ACK for the PDSCH transmitted at the T1 and repeat the information in the next reporting. As a result, with a repetition factor equal to two, the peak throughput is reduced by two times, whereby even though the coverage of the physical uplink control channel (PUCCH) is improved by using repetition, the peak downlink throughput is reduced.

The technology described herein allows for HARQ-ACK repetition without reducing peak downlink throughput by using orthogonal resources at different time slots. The repetition of the same uplink feedback signal enhances the reliability of the reception of the feedback at the network node. The term 'repeated content' may also be interchangeably called as 'redundancy content' or multi-slot. As will be understood, transmission of repeated contents may be sent in the same message or transmission occasion or instances or over multiple messages or channel transmission occasions or instances.

In one implementation, the network alternates between orthogonal PDSCH resources for downlink transmissions over consecutive time slots, and the user equipment is configured to report the HARQ-ACK on a PUCCH physical uplink control channel based on a group (or set) of PUCCH resources that are orthogonal with respect to those subsequent downlink transmissions. Note that "orthogonal" as used herein means that interference is avoided (or at least meaningfully reduced) within a time slot, e.g., because the resources are different in frequency, time, orthogonal cover code, cyclic shifts, spreading factors and/or frequency hopping. Thus, in this implementation, the network indicates only one PUCCH resource for reporting HARQ-ACK for the first downlink transmission, e.g., identified herein as PDSCH1. As a result of the orthogonal resources, via a different resource group for PDSCH2, the network can schedule subsequent downlink transmissions in consecutive time slots. In general, the network alternates through different orthogonal resource groups when scheduling downlink transmissions over consecutive time slots so that repeated HARQ-ACKs for a transmission do not cause interference with subsequent downlink transmissions.

The network node configures the user equipment to use the uplink control channel information (PUCCH) resources for each slot; e.g., if the network configures the user equipment to use K slots for sending HARQ-ACK, then the resources for each slot are indicated. Thus, if at time slot T1+1 the user equipment is using resources for PDSCH1, then at the next instance (e.g., T1+2), the user equipment will be using different resources orthogonal (completely orthogonal or semi-orthogonal) to the resources in T1+1, and so on.

Note that in the above example, at T1+2, the user equipment can reuse resources for PDSCH2 without causing any interference to the resources for transmitting HARQ-ACK for PDSCH1. Thus, the peak throughput as well as enhanced coverage can be achieved.

In an alternative implementation, when a user equipment is configured in a multi-slot configuration with a repetition factor equal to K (e.g., K=1, 2, 3 or 4), the network node pre-defines K PUCCH resources, and informs the user equipment during Radio Resource Control (RRC) setup. At the time of scheduling, the network indicates an index of the K PUCCH resources for the first downlink transmission, PDSCH1. Hence, the user equipment repeats the HARQ-ACK on different PUCCH resources (rather than using the same resource group). Note that this technique provides additional diversity in addition to repetition gain for HARQ-ACK. Note that for the subsequent downlink transmission PDSCH2, the network can reuse the same resources as that of PDSCH1, provided the network indicates this information in the downlink control information (DCI).

The following is a non-limiting example of a PUCCH resource, that is, a PUCCH resource can include values for one or more of the following parameters; note that some of these of these parameters can be sent to the user equipment using RRC signaling or dynamic signaling using DCI (and the parameters are not necessarily in any order):

1) an index of the first symbol
   2) a number of OFDM symbols
   3) an index of the first PRB prior to frequency hopping or for no frequency hopping
   4) an index of the first PRB after frequency hopping
   5) a number of PRBs
   6) frequency hopping
   7) frequency hopping for a PUCCH resource is either enabled or disabled
   8) an index of the cyclic shift
   9) an index of an orthogonal cover code
   a) the index of the orthogonal cover code can be from a set of {0, 1, 2, 3} as described in standards and, for example, can be indicated by higher layer parameter PUCCH-F4-preDFT-OCC-index;
   10) a spreading factor for an orthogonal cover code
   a) The spreading factor of PUCCH format 4 can be from a set of {2, 4} as described in standards and, for example, can be indicated by higher layer parameter PUCCH-F4-preDFT-OCC-length.

A user equipment can be configured with a number of sets (or groups) of PUCCH resources such as by a higher-layer parameter PUCCH-resource-set, where the number of PUCCH resources in each set of PUCCH resources is provided by a higher-layer parameter PUCCH-resource-set-size, and where a PUCCH resource in a set of PUCCH resources is indicated by a higher-layer parameter PUCCH-resource-index.

It should be understood that any of the examples and terms used herein are non-limiting. For instance, some examples are based on New Radio (NR, sometimes referred to as 5G) communications between a user equipment exemplified as a smartphone or the like and network device; however virtually any communications devices may benefit from the technology described herein, and/or their use in different spectrums may likewise benefit. Thus, any of the embodiments, aspects, concepts, structures, functionalities or examples described herein are non-limiting, and the technology may be used in various ways that provide benefits and advantages in radio communications in general.

One example scenario comprises of a user equipment served by a first cell, which in turn is served by a network node. The user equipment may be configured by the network node to obtain or determine HARQ ACK/NACK. The user equipment may further be configured to obtain and transmit uplink feedback information to the network node. The UE may even be configured to obtain and transmit plural types of uplink feedback information to the network node. The user equipment further may be configured by the network node with at least a first repetition factor (K) based on one or more criterion, e.g., the location of the user equipment relative to the cell, such as whether the user equipment is at the cell edge or when the path loss is very high or received signal to noise ratio is very low. The value of K is to be used by the UE for repeating the same content of HARQ-ACK either implicitly or explicitly and transmitting repeated content to the second network node.

The repetition of the same uplink feedback signal enhances the reliability of the reception of the feedback at the network node. The term 'repeated content' may also be interchangeably called as 'redundancy content'. The transmission of the repeated contents may be sent in the same message or transmission occasion or instances or over multiple messages or channel transmission occasions or instances.

FIG. 1 illustrates an example wireless communication system 100 in accordance with various aspects and embodiments of the subject technology. In one or more embodiments, the system 100 can comprise one or more user equipment, e.g., UEs 102(1)-102(n).

In various embodiments, the system 100 is or comprises a wireless communication network serviced by one or more wireless communication network providers. In example embodiments, a UE 102 can be communicatively coupled to the wireless communication network via a network node 104. The network node (e.g., network node device) can communicate with the user equipment (UE), thus providing connectivity between the UE and the wider cellular network.

In example implementations, each UE such as the UE 102(1) is able to send and/or receive communication data via a wireless link to the network node 104. The dashed arrow lines from the network node 104 to the UE 102 represent downlink (DL) communications and the solid arrow lines from the UE 102 to the network nodes 104 represents uplink (UL) communications.

The system 100 can further include one or more communication service provider networks 106 that facilitate providing wireless communication services to various UEs, including UES 102(1)-102(n), via the network node 104 and/or various additional network devices (not shown) included in the one or more communication service provider networks 106. The one or more communication service provider networks 106 can include various types of disparate networks, including but not limited to: cellular networks, femto networks, picocell networks, microcell networks, internet protocol (IP) networks Wi-Fi service networks, broadband service network, enterprise networks, cloud based networks, and the like. For example, in at least one implementation, system 100 can be or include a large scale wireless communication network that spans various geographic areas. According to this implementation, the one or more communication service provider networks 106 can be or include the wireless communication network and/or various additional devices and components of the wireless communication network (e.g., additional network devices and cell, additional UEs, network server devices, etc.).

The network node 104 can be connected to the one or more communication service provider networks 106 via one or more backhaul links 108. For example, the one or more backhaul links 108 can comprise wired link components, such as a T1/E1 phone line, a digital subscriber line (DSL) (e.g., either synchronous or asynchronous), an asymmetric DSL (ADSL), an optical fiber backbone, a coaxial cable, and the like. The one or more backhaul links 108 can also include wireless link components, such as but not limited to, line-of-sight (LOS) or non-LOS links which can include terrestrial air-interfaces or deep space links (e.g., satellite communication links for navigation).

The wireless communication system 100 can employ various cellular systems, technologies, and modulation schemes to facilitate wireless radio communications between devices (e.g., the UE 102 and the network node 104). While example embodiments might be described for 5G new radio (NR) systems, the embodiments can be applicable to any radio access technology (RAT) or multi-RAT system where the UE operates using multiple carriers e.g. LTE FDD/TDD, GSM/GERAN, CDMA2000 etc. For example, the system 100 can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system 100 are particularly described wherein the devices (e.g., the UEs 102 and the network device 104) of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, the system 100 can be configured to provide and employ 5G wireless networking features and functionalities. With 5G networks that may use waveforms that split the bandwidth into several sub-bands, different types of services can be accommodated in different sub-bands with the most suitable waveform and numerology, leading to improved spectrum utilization for 5G networks. Notwithstanding, in the mmWave spectrum, the millimeter waves have shorter wavelengths relative to other communications waves, whereby mmWave signals can experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the third-generation partnership project (3GPP) and has been in use (including with LTE), is a multi-antenna technique that can improve the spectral efficiency of transmissions, thereby significantly boosting the overall data carrying capacity of wireless systems. The use of multiple-input multiple-output (MIMO) techniques can improve mmWave communications; MIMO can be used for achieving diversity gain, spatial multiplexing gain and beamforming gain.

Note that using multi-antennas does not always mean that MIMO is being used. For example, a configuration can have two downlink antennas, and these two antennas can be used in various ways. In addition to using the antennas in a 2×2 MIMO scheme, the two antennas can also be used in a diversity configuration rather than MIMO configuration. Even with multiple antennas, a particular scheme might only use one of the antennas (e.g., LTE specification's transmission mode 1, which uses a single transmission antenna and a single receive antenna). Or, only one antenna can be used, with various different multiplexing, precoding methods etc.

The MIMO technique uses a commonly known notation (M×N) to represent MIMO configuration in terms number of transmit (M) and receive antennas (N) on one end of the transmission system. The common MIMO configurations used for various technologies are: (2×1), (1×2), (2×2), (4×2), (8×2) and (2×4), (4×4), (8×4). The configurations represented by (2×1) and (1×2) are special cases of MIMO known as transmit diversity (or spatial diversity) and receive diversity. In addition to transmit diversity (or spatial diversity) and receive diversity, other techniques such as spatial multiplexing (comprising both open-loop and closed-loop), beamforming, and codebook-based precoding can also be used to address issues such as efficiency, interference, and range.

In FIG. 1, as described herein, a user equipment (e.g., 102(1)) is configured to provide the network node with a single or multiple HARQ-ACK response 110, for use in determining whether a PDSCH data packet (e.g., 112) was successfully received or needs to be retransmitted. To this end, the user equipment transmits via the uplink control channel, which carries information about HARQ-ACK information corresponding to the downlink data transmission, and channel state information. As will be understood, the network node decomposes or otherwise evaluates the HARQ-ACK response 110 to make the determination regarding packet acknowledgement or negative acknowledgement.

As described herein, the network node 104 sends resources data 112, such as corresponding to PDSCH or PUCCH resource groups, to the user equipment (e.g., 102(1)). If the repetition factor for HARQ-ACK responses indicates that repeated HARQ-ACK responses are needed, the PDSCH or PUCCH resource groups are arranged so that transmissions in subsequent time slots are orthogonal to the HARQ-ACK responses in any time slot.

As represented in FIG. 2 in a more particular example, consider that the repetition factor K is set to four, and that at least eight downlink PDSCH transmissions are scheduled, identified (in alphabetical order corresponding to time slots) as PDSCHa-PDSCHh. As can be seen, in a first time (slot), PDSCHa is scheduled and sent based on the resource parameter values in PDSCH (downlink) resource group RG-1, with a first of the four HARQ-ACKs (HARQa1 of HARQa1-HARQa4) sent in response based on the resource parameter values in PUCCH (uplink) resource group RG-A. Note that the PDSCHa transmission (or other communicated data) can specify to the user equipment that the user equipment is to use PUCCH (uplink) resource group RG-A for its four HARQ-ACKs to this PDSCHa transmission (e.g., in FIG. 2, PDSCHa is followed by a "(-A)"). In a second time slot, PDSCHb is scheduled to be sent on a different PDSCH (downlink) resource group RG-2 that is orthogonal to the repeated (second) HARQ-ACK for the PDSCHa transmission, namely HARQa2, and also the PUCCH resource group RG-B is to be used for these corresponding four HARQ-ACKs. Because of the orthogonality, PDSCHb is able to be scheduled in the second time slot without significant interference from HARQa2.

As can be seen, each of the transmissions PDSCHa-PDSCHh are able to be scheduled in consecutive time slots, yet (assuming that in this example each PDSCH transmission is received and that the time slots extend beyond those illustrated) each PDSCH transmission has its repetition factor-based four HARQ-ACKs sent in response. Note that it is possible that any of PDSCHa-PDSCHh can be retransmitted because of a NACK; e.g., PDSCHa could be retransmitted as PDSCHd. Note further that the PDSCH resource group RG-1 and the PUCCH resource group RG-A can be reused in time slot 5 because the four HARQ-ACKs for PDSCHa have already been sent by that fifth time slot; similarly the PDSCH resource group RG-2 and the PUCCH resource group RG-B can be reused in time slot 6 and so on. The quantity of different PDSCH resource groups/PUCCH resource groups is at least equal to the repetition factor.

Note that the value of the repetition factor may change over time based on current conditions, e.g., when the user equipment is close to the network transmitter the value may be one, whereas the value increases as the user equipment moves away from the network transmitter. The value may be computed based on a combination of various criteria, and may be determined by the network node and communicated to the user equipment, or may be determined by the user equipment and communicated to the network node. In any event, each participant obtains and knows the current value of the repetition factor. The uplink feedback information can reuse the legacy HARQ-ACK structure for the multi-codeword HARQ-ACK or in some instances, may reuse the same structure as that of single codeword. If the repetition factor increases, the resource group information may need to be updated on the user equipment, if, for example, only two orthogonal resource groups were previously in use and their data needed, but now four are needed and the additional resource groups' data is needed at the user equipment.

Figure 3:
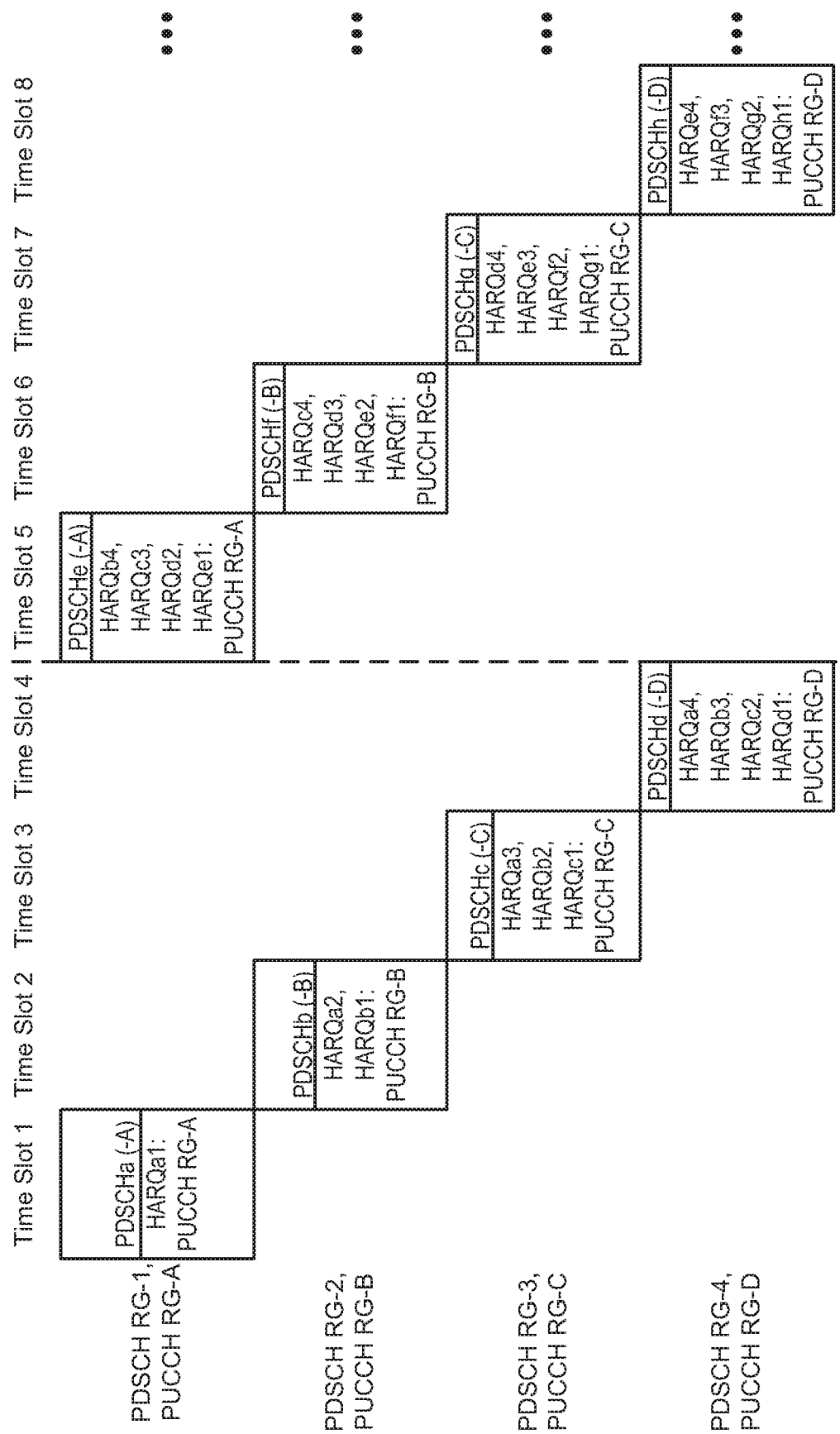
FIG. 3 illustrates an example of communicating PDSCH downlink transmissions and associated PUCCH HARQ-ACK composed responses, in accordance with various aspects and implementations of the subject disclosure.

FIG. 3 shows the same general concept of that represented in FIG. 2, except that the HARQ-ACKs sent in a time slot are composited; e.g., in time slot 3, HARQa3, HARQb2, and HARQc1 are sent composed together in one response via PUCCH resource group RG-C. Again, the orthogonality of the resource groups helps to avoid interference, and indeed, if for example PUCCH resource group RG-A is orthogonal to the PDSCH resource groups, the PUCCH resources can be reused without interference.

In an alternative implementation, exemplified in FIG. 4, the user equipment alternates the PUCCH resource groups that are selected for each repeated HARQ-ACKs. In other words, instead of alternating the PDSCH resource groups as in FIGS. 2 and 3, the PDSCH resources can be reused for downlink transmissions by selecting between different PUCCH resource groups for each HARQ-ACK to maintain orthogonality within any given time slot.

Figure 5:
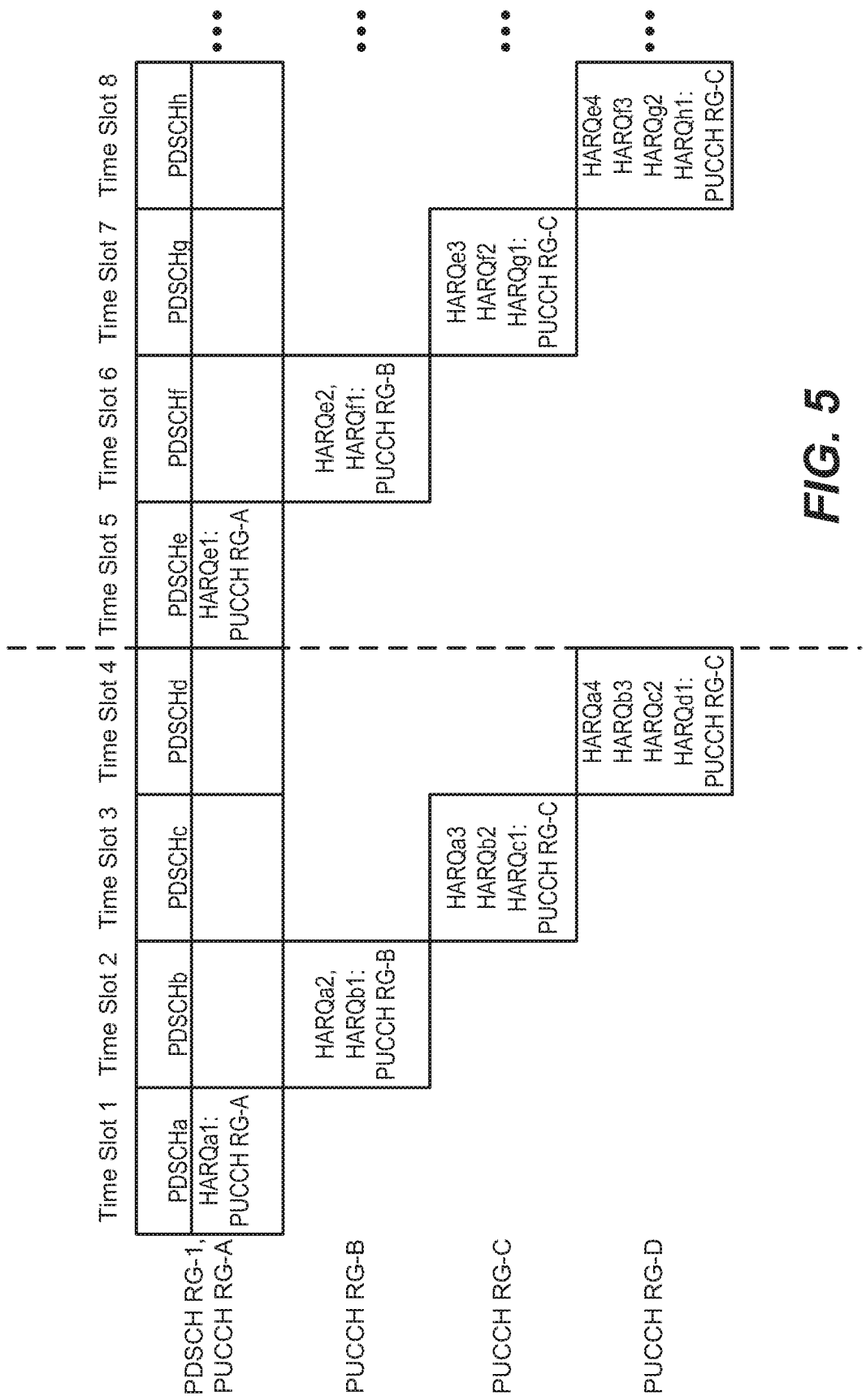
FIG. 5 illustrates an example of communicating PDSCH downlink transmissions and associated PUCCH HARQ-ACK composed responses with changed PUCCH resources, in accordance with various aspects and implementations of the subject disclosure.

Thus, in the example of FIG. 4 in which the repetition factor again equals four, the four HARQ-ACKs HARQa1-HARQa4 for PDSCHa are sent using orthogonally different PUCCH resource groups RG-A-RG-D. As a result, PDSCHb can be scheduled in the next time slot, using the same PDSCH resources as PDSCHa (if desired), and so on. Note that in this alternative implementation, DCI indicates to the user equipment the PUSCH (physical uplink shared channel) resources for each repeated HARQ-ACK FIG. 5 shows a composite example corresponding to the alternating PUCCH resource groups of FIG. 4, in which HARQ-ACKs for different PDSCH transmissions are composed into one PUCCH transmission per time slot.

Figure 6:
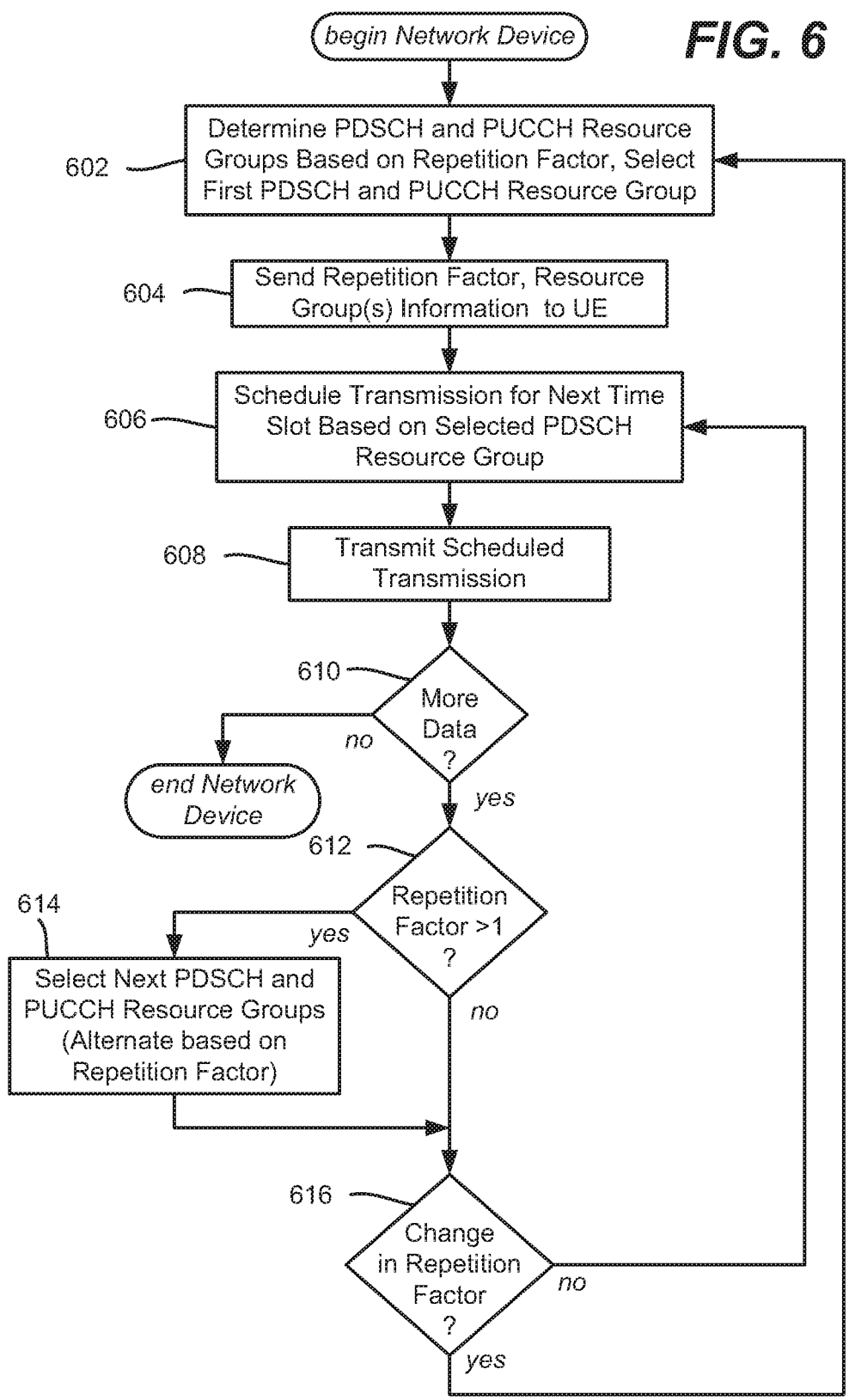
FIG. 6 illustrates an example flow diagram of network node operations for transmitting PDSCH downlink transmissions in which PUCCH resources remain the same for a given transmission's HARQ-ACKs, in accordance with various aspects and implementations of the subject disclosure.

FIG. 6 summarizes some example operations of a network node with respect to a configuration (e.g., as exemplified in FIG. 2) in which the user equipment repeats (if appropriate) the HARQ-ACKs for a first downlink transmission using first PUCCH resources, and for a second downlink transmission repeats the HARQ-ACKs using second PUCCH resources, and so on. In the example operations of FIG. 6, the repetition factor is used to determine whether or not repeated HARQ-ACK responses are needed. Note that in any of the figures that refer to operations, the order of the operations may be different from that exemplified.

Operation 602 represents determining the PDSCH and PUCCH resource group(s) based on the repetition factor (determined in a known manner). In this example, the first PDSCH resource group and first PUCCH resource group is selected for the first packet transmission. Note that although not shown, it is understood that the network device sends the PUCCH resource group information (e.g., the groups' parameters) to the user equipment if not otherwise known to the user equipment, such as at step 602. Operation 602 sends the repetition factor and resource group information to the user equipment; (note that if repetition is not needed, by default the repetition factor can be one unless and until changed).

Operation 606 represents scheduling a downlink PDSCH transmission for a next (which for now is the first) time slot based on the selected PDSCH resource group. The downlink PDSCH transmission is transmitted at operation 608, and as described herein with reference to FIG. 2, may include an indication of which PUCCH resource group the user equipment is to use for sending HARQ-ACKs to this transmission. Operation 610 ends the downlink transmission process if there is no more data, until more data to transmit is ready.

Operation 612 evaluates the repetition factor; if equal to one, the conventional process is used and the same resource groups can be used for further transmissions, unless and until changed. If the repetition factor is not equal to one, operation 614 selects the next PDSCH and PUCCH resource groups, such as in an alternating pattern. For example, if the repetition factor is two, a suitable pattern may be (PDSCH RG-1, PUCCH RG-A), (PDSCH RG-2, PUCCH RG-B), (PDSCH RG-1, PUCCH RG-A), (PDSCH RG-2, PUCCH RG-B) and so on.

Operation 616 handles a situation in which the repetition factor changes. If not changed, operation 616 returns to operation 606 to schedule the next downlink transmission and so on until no data remains to transmit. Note that a next downlink transmission at operation 606 may be a retransmission of a previously sent packet if a NACK was received, for example. If the repetition factor changes, operation 616 returns to operation 602 in general to start the process over.

Figure 7:
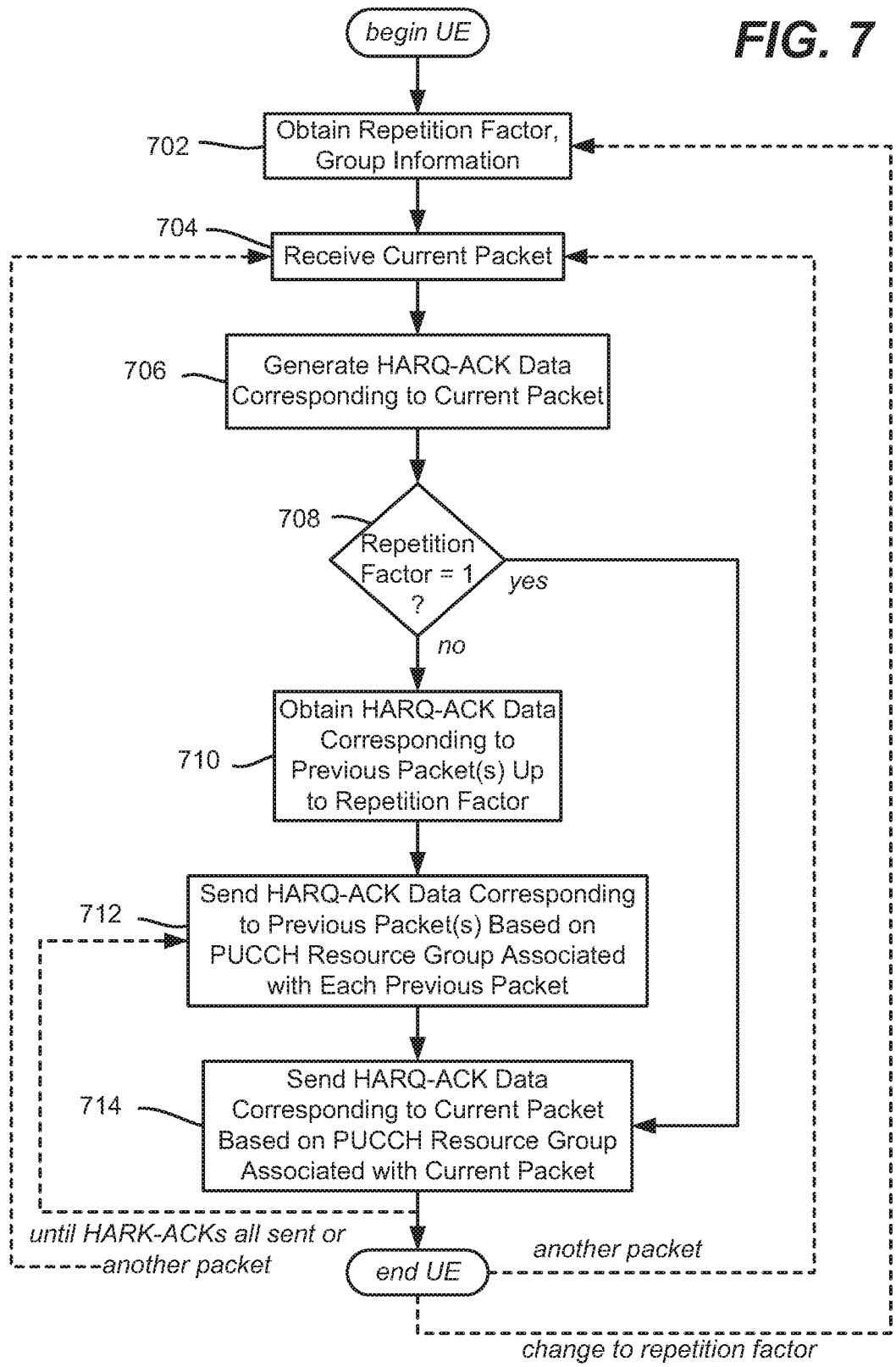
FIG. 7 illustrates an example flow diagram of user equipment operations for transmitting PDSCH downlink transmissions in which PUCCH resources remain the same for a given transmission's HARQ-ACKs, in accordance with various aspects and implementations of the subject disclosure.

FIG. 7 represents some example operations of a user equipment that is communicating with a network device that generally performs the operations described with reference to FIG. 6. Operation 702 represents obtaining the repetition factor and group information from the network node (or possible obtaining it inherently).

Operation 704 represents receiving a PDSCH transmission (a current packet) from the network node. Operation 706 represents generating the HARQ-ACK data with respect to this transmission.

If at operation 708 the repetition factor is one, then operation 714 is performed to send the HARQ-ACK based on the (single) PUCCH resource group in use. Otherwise, operations 710 and 712 are performed.

Operation 710 represents obtaining (e.g., accessing from memory) the HARQ-ACK data to be repeated from previous packets received, if any, which as is understood is based on the repetition factor. Operation 712 sends these HARQ-ACKs, with each transmission based on its associated resource group. Operation 714 is performed to send the HARQ-ACK based on the PUCCH resource group associated with the current packet. Note that a composited HARQ-ACK response such as described above with reference to FIG. 3 is a feasible alternative.

As represented in FIG. 7 via the dashed lines, if no packets are pending, operations 712 and 714 are performed as needed until no repeated HARQ-ACKs remain to be send. If one more packets are received during this time, the exemplified user equipment process returns to operation 704. The operations can also "end" if nothing remains to be done, until another packet is received, in which event the exemplified user equipment process returns to operation 704. As also represented in FIG. 7, the repetition factor may change (which may be at any appropriate time), which in general restarts the process at operation 702 following an appropriate operation, which can be after the "end" of the operations.

Figure 8:
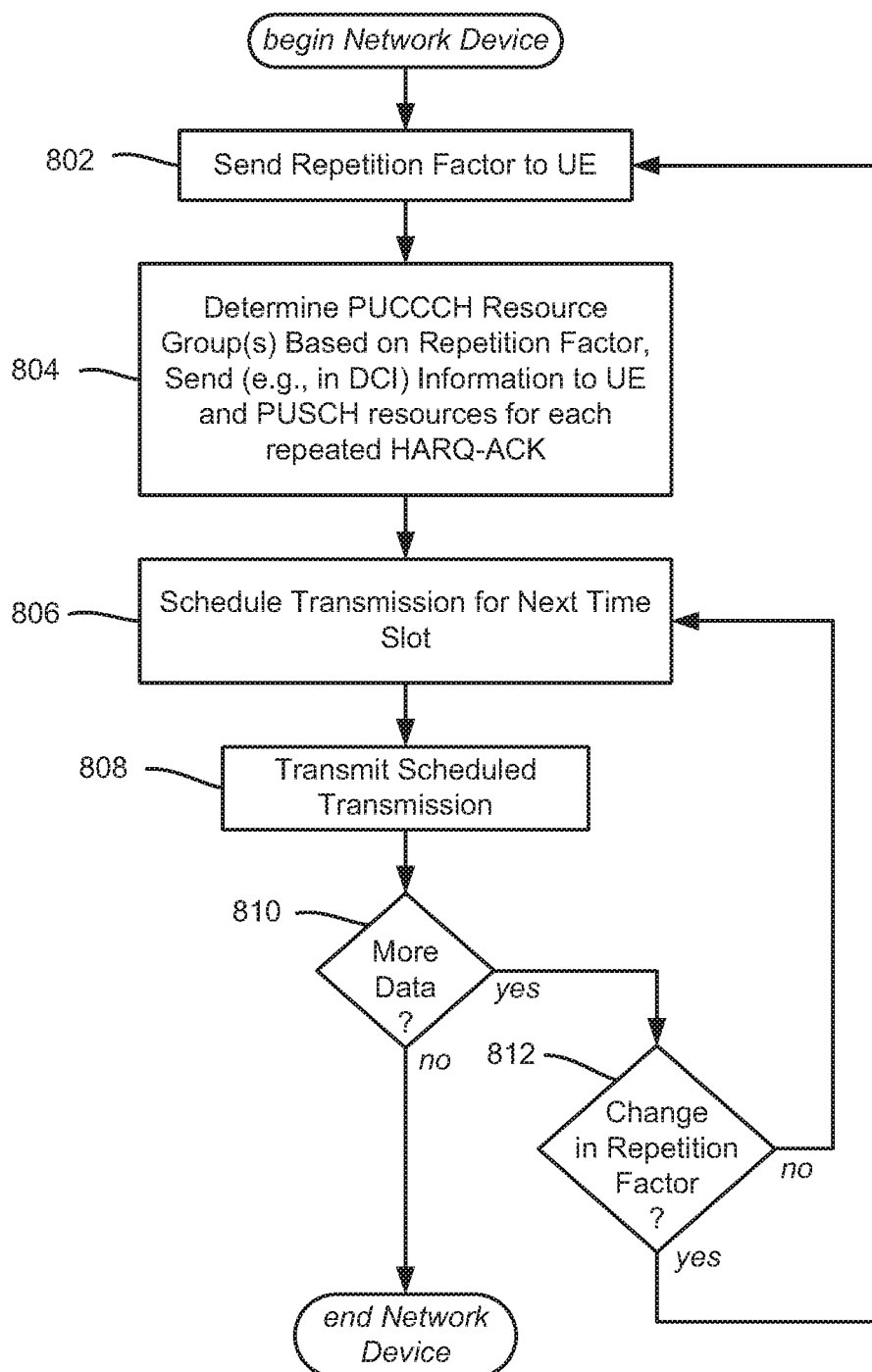
FIG. 8 illustrates an example flow diagram of network node operations for transmitting PDSCH downlink transmissions in which PUCCH resources change for a given transmission's HARQ-ACKs, in accordance with various aspects and implementations of the subject disclosure.

FIG. 8 summarizes some example operations of a network node with respect to a configuration (e.g., as exemplified in FIG. 4) in which the user equipment repeats, according to the repetition factor K (if appropriate), the HARQ-ACKs for downlink transmissions using alternating one-through-K PUCCH resources (resource groups). For example, for a first PDSCH transmission based on a repetition factor of four, the first HARQ-ACK is sent based on PUCCH resource group A, the second HARQ-ACK is sent based on PUCCH resource group B, the third HARQ-ACK is sent based on PUCCH resource group C and the fourth HARQ-ACK is sent based on PUCCH resource group D.

Operation 802 represents sending the repetition factor to the user equipment, and operation 804 represents determining and sending the PUCCH resource group information to the user equipment, along with PUSCH resources information for each repeated HARQ-ACK.

Operation 806 schedules a packet in a next (for now the first time slot), which is transmitted at operation 808. If more PDSCH data remains to be transmitted (operation 810) and there is no change in the repetition factor (operation 812), the further data is scheduled (operation 806) and transmitted (operation 808).

Figure 9:
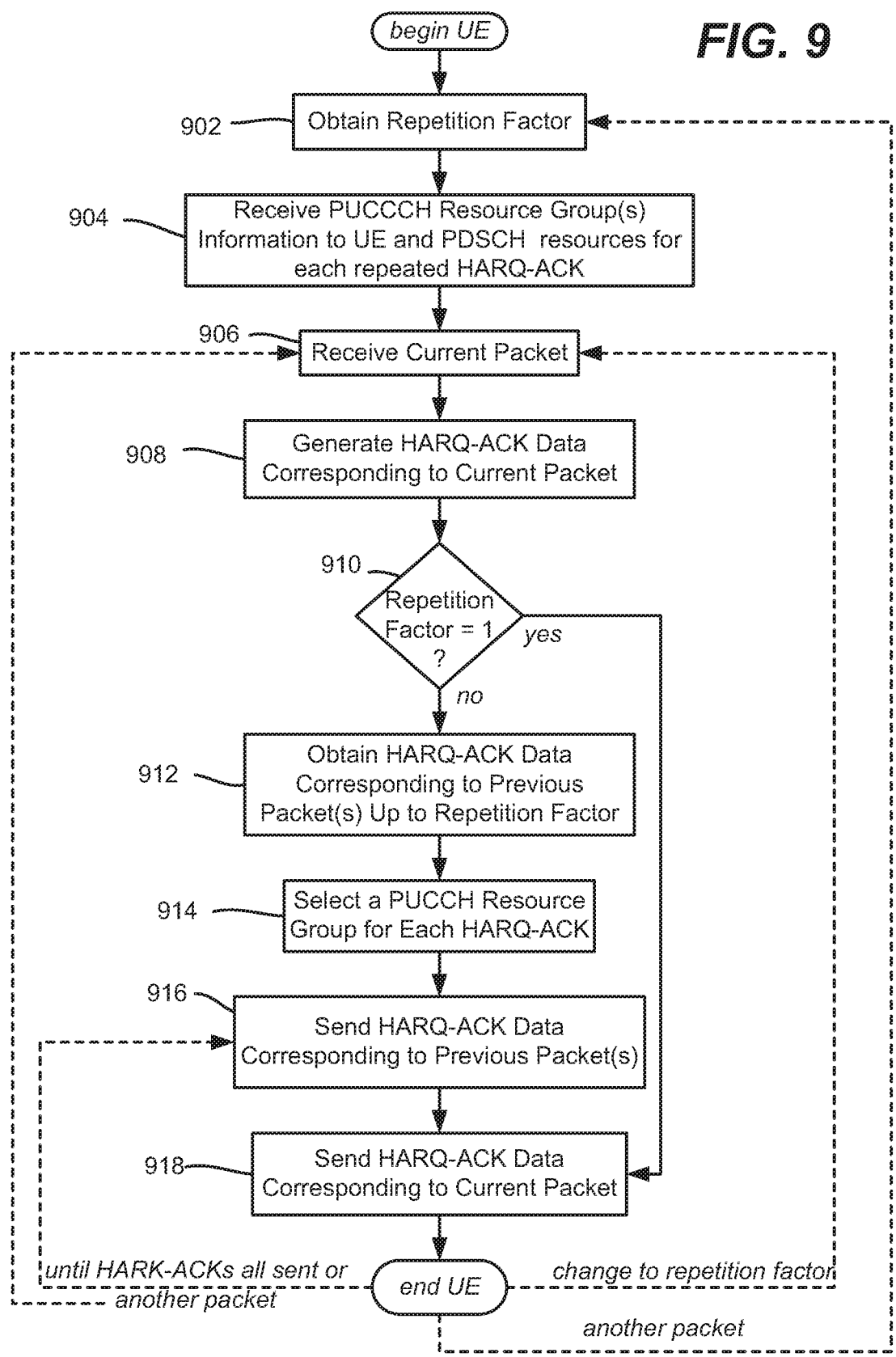
FIG. 9 illustrates an example flow diagram of user equipment operations for transmitting PDSCH downlink transmissions in which PUCCH resources change for a given transmission's HARQ-ACKs, in accordance with various aspects and implementations of the subject disclosure.

FIG. 9 represents some example operations of a user equipment that is communicating with a network device that generally performs the operations described with reference to FIG. 8. Operation 902 represents obtaining the repetition factor from the network node (or possible obtaining it inherently) and operation 904 represents receiving the group information from the network node.

Operation 906 represents receiving a PDSCH transmission (a current packet) from the network node. Operation 908 represents generating the HARQ-ACK data with respect to this transmission.

If at operation 910 the repetition factor is one, then operation 918 is performed to send the HARQ-ACK based on the (single) PUCCH resource group in use. Otherwise, operations 912, 914, 916 and 918 are performed.

Operation 912 represents obtaining (e.g., accessing from memory) the HARQ-ACK data to be repeated from previous packets received, if any, which as is understood is based on the repetition factor. Operation 914 selects the associated (e.g., the next one in the pattern) PUCCH resource group for each HARQ-ACK, and operation 916 sends these HARQ-ACKs for each previously received transmission based on its selected resource group. Operation 918 is performed to send the HARQ-ACK based on the PUCCH resource group associated with the current packet. Note that a composited HARQ-ACK response such as described above with reference to FIG. 5 is a feasible alternative.

As represented in FIG. 9 via the dashed lines, if no packets are pending, operations 916 and 918 are performed as needed until no repeated HARQ-ACKs remain to be send. If one more packets are received during this time, the exemplified user equipment process returns to operation 906. The operations can also "end" if nothing remains to be done, until another packet is received, in which event the exemplified user equipment process returns to operation 906. As also represented in FIG. 9, the repetition factor may change (which may be at any appropriate time), which in general restarts the process at operation 902 following an appropriate operation, which can be after the "end" of the operations.

Figure 10:
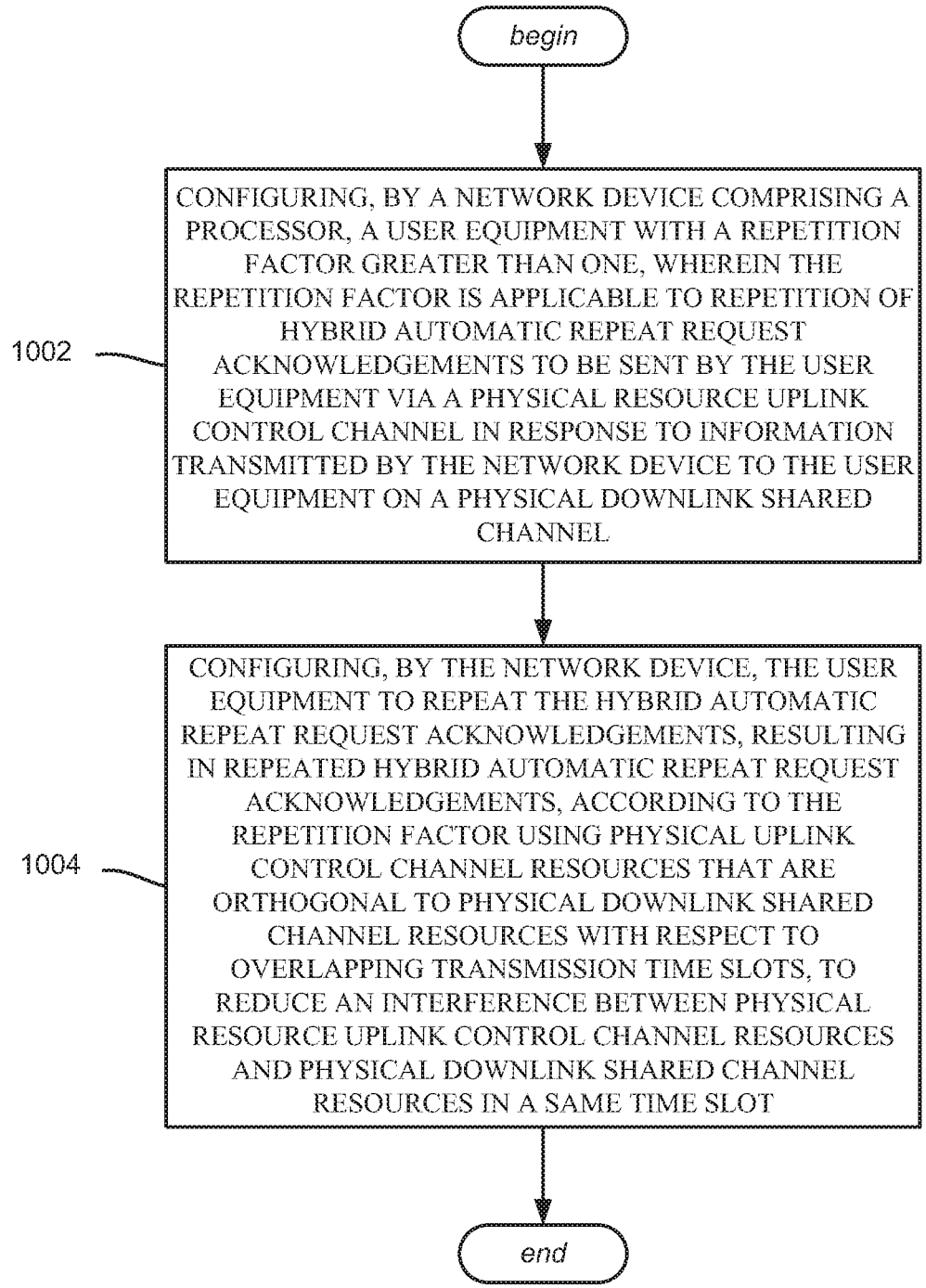
FIG. 10 illustrates an example flow diagram of aspects of network device operations, in accordance with various aspects and implementations of the subject disclosure.

One or more aspects, generally represented in FIG. 10, represent example operations comprising (operation 1002) configuring, by a network device comprising a processor, a user equipment with a repetition factor greater than one, wherein the repetition factor is applicable to repetition of hybrid automatic repeat request acknowledgements to be sent by the user equipment via a physical resource uplink control channel in response to information transmitted by the network device to the user equipment on a physical downlink shared channel. Operation 1004 represents configuring, by the network device, the user equipment to repeat the hybrid automatic repeat request acknowledgements, resulting in repeated hybrid automatic repeat request acknowledgements, according to the repetition factor using physical uplink control channel resources that are orthogonal to physical downlink shared channel resources with respect to overlapping transmission time slots, to reduce an interference between physical resource uplink control channel resources and physical downlink shared channel resources in a same time slot.

Configuring the user equipment to repeat the hybrid automatic repeat request acknowledgements according to the repetition factor further may comprise transmitting data corresponding to first groups of orthogonal physical downlink shared channel resource parameters and second groups of orthogonal physical uplink control channel resource parameters to the user equipment, and wherein a quantity of the first groups of orthogonal physical downlink shared channel resource parameters is at least as large as the repetition factor.

The repeated hybrid automatic repeat request can be first repeated hybrid automatic repeat request acknowledgements, and the information transmitted by the network device to the user equipment on the physical downlink shared channel can be information, in which one or more aspects can comprise facilitating, by the network device, transmitting second information from the network device to the user equipment in a first time slot based on a first group of physical downlink shared channel resource parameters, facilitating, by the network device, transmitting third information from the network device to the user equipment in a second, consecutive time slot based on a second group of physical downlink shared channel resource parameters orthogonal to the first group of physical downlink shared channel resource parameters, wherein the configuring the user equipment to repeat the first hybrid automatic repeat request acknowledgements according to the repetition factor comprises instructing the user equipment to use a first group of physical resource uplink control channel resource parameters that correspond to the first group of physical downlink shared channel resource parameters for the first repeated hybrid automatic repeat request acknowledgements in response to the first information being transmitted, and instructing, by the network device, the user equipment to use a second group of orthogonal physical resource uplink control channel resource parameters for second repeated hybrid automatic repeat request acknowledgements in response to the third information being transmitted.

Configuring the user equipment to repeat the hybrid automatic repeat request acknowledgements according to the repetition factor further may comprise transmitting data corresponding to groups of orthogonal physical uplink control channel resource parameters to the user equipment, wherein a quantity of the groups of orthogonal physical uplink control channel resource parameters is at least as large as the repetition factor.

Configuring the user equipment to repeat the hybrid automatic repeat request acknowledgements according to the repetition factor may comprise instructing the user equipment to use a different group of orthogonal physical resource uplink control channel resource parameters for each repeated hybrid automatic repeat request acknowledgement of the repeated hybrid automatic repeat request acknowledgements to be sent in response to a same transmission.

One or more aspects may comprise setting, by the network device, at least two of the groups of the orthogonal physical uplink control channel resource parameters to comprise different frequency parameter values.

One or more aspects may comprise setting, by the network device, at least two of the groups of the orthogonal physical uplink control channel resource parameters to comprise different time parameter values. One or more aspects may comprise comprising setting, by the network device, at least two of the groups of the orthogonal physical uplink control channel resource parameters to comprise different orthogonal cover code parameter values. One or more aspects may comprise setting, by the network device, at least two of the groups of the orthogonal physical uplink control channel resource parameters to comprise different spreading factor parameter values for an orthogonal cover code. One or more aspects may comprise configuring, by the network device, at least two of the groups of the orthogonal physical uplink control channel resource parameters to comprise different frequency hopping parameter values. One or more aspects may comprise configuring, by the network device, at least two of the groups of the orthogonal physical uplink control channel resource parameters to comprise different cyclic shift parameter values.

Figure 11:
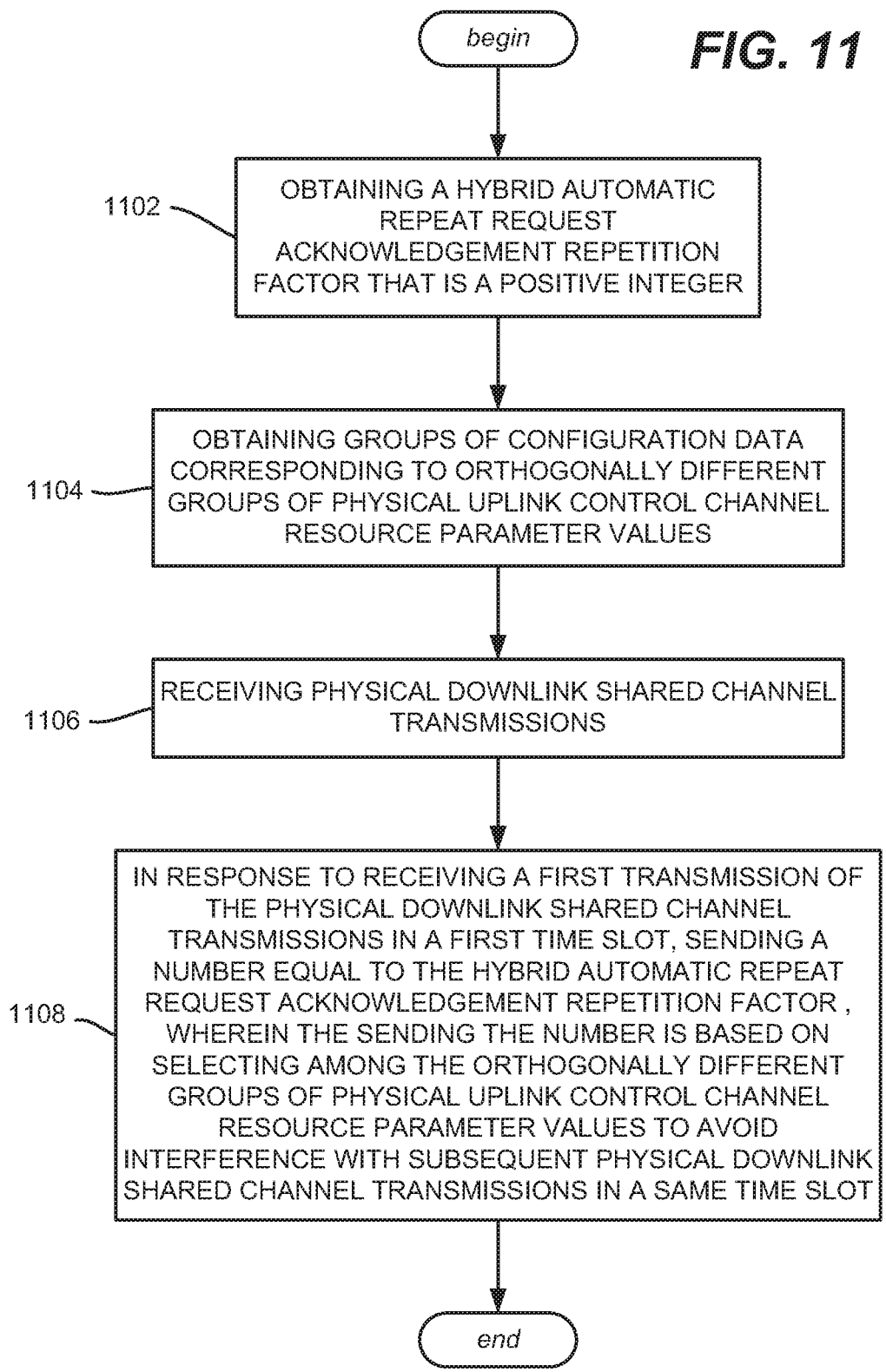
FIG. 11 illustrates an example flow diagram of aspects of user equipment operations, in accordance with various aspects and implementations of the subject disclosure.

One or more aspects are directed towards example operations represented in FIG. 11, e.g., executed via a user equipment processor based on a memory that stores executable instructions that, when executed by the processor, facilitate performance of the operations. Operation 1102 represents obtaining a hybrid automatic repeat request acknowledgement repetition factor that is a positive integer. Operation 1104 represents obtaining groups of configuration data corresponding to orthogonally different groups of physical uplink control channel resource parameter values. Operation 1106 represents receiving physical downlink shared channel transmissions. Operation 1108 represents, in response to receiving a first transmission of the physical downlink shared channel transmissions in a first time slot, sending a number equal to the hybrid automatic repeat request acknowledgement repetition factor, wherein the sending the number is based on selecting among the orthogonally different groups of physical uplink control channel resource parameter values to avoid interference with subsequent physical downlink shared channel transmissions in a same time slot.

The hybrid automatic repeat request acknowledgement repetition factor can be at least two, and the operations can further comprise, receiving a second transmission of the physical downlink shared channel transmissions on a different, orthogonal physical downlink shared channel in a second time slot, and wherein the selecting among the orthogonally different groups of physical uplink control channel resource parameter values comprises using a first group of physical uplink control channel resource parameter values for the hybrid automatic repeat request acknowledgements for the first transmission, and using a second group of physical uplink control channel resource parameter values for the hybrid automatic repeat request acknowledgements for the second transmission.

The hybrid automatic repeat request acknowledgement repetition factor can be at least two, and selecting among the orthogonally different groups of physical uplink control channel resource parameter values can comprise using an orthogonally different group of physical uplink control channel resource parameter values for each hybrid automatic repeat request acknowledgements of the hybrid automatic repeat request acknowledgements for the first transmission.

One of the groups of configuration data can comprise a dataset, and the dataset can comprise at least one of: a first index of a first symbol, a number of orthogonal frequency division multiplex symbols, a second index of at least one first physical resource block associated with frequency hopping data indicating no frequency hopping, a number of physical resource blocks, the frequency hopping data indicating whether frequency hopping for the group of physical control channel resource group is enabled or disabled, a third index representative of a cyclic shift, a fourth index of an orthogonal cover code, or a spreading factor for the orthogonal cover code.

Two of the groups of the configuration data can comprise an orthogonal parameter value difference comprising at least one of a different frequency parameter value, a different time parameter value, a different orthogonal cover code parameter value, a different cyclic shift parameter value, a different spreading factor parameter value for an orthogonal cover code, or a different frequency hopping parameter value.

Figure 12:
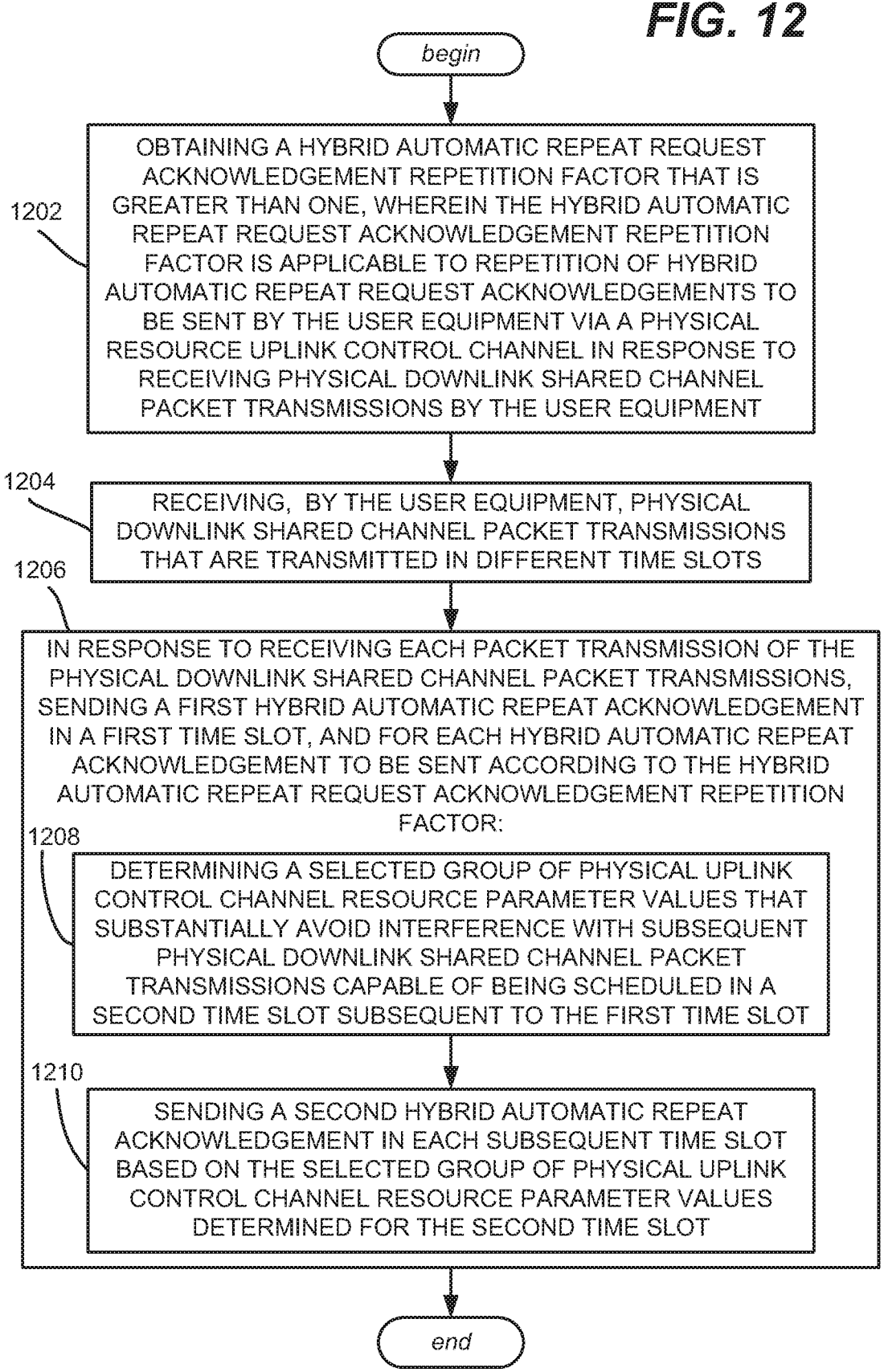
FIG. 12 illustrates an example flow diagram of aspects of user equipment operations, in accordance with various aspects and implementations of the subject disclosure.

FIG. 12 represents example operations, including operation 1202, which represents obtaining a hybrid automatic repeat request acknowledgement repetition factor that is greater than one, wherein the hybrid automatic repeat request acknowledgement repetition factor is applicable to repetition of hybrid automatic repeat request acknowledgements to be sent by the user equipment via a physical resource uplink control channel in response to receiving physical downlink shared channel packet transmissions by the user equipment. Operation 1204 represents receiving physical downlink shared channel packet transmissions by the user equipment that are transmitted in different time slots. Operation 1206, which comprises operations 1208 and 1210, represents, in response to receiving each packet transmission of the physical downlink shared channel packet transmissions, sending a first hybrid automatic repeat acknowledgement in a first time slot, and for each hybrid automatic repeat acknowledgement to be sent according to the hybrid automatic repeat request acknowledgement repetition factor, performing operation 1208 which represents determining a selected group of physical uplink control channel resource parameter values that substantially avoid interference with subsequent physical downlink shared channel packet transmissions capable of being scheduled in a second time slot subsequent to the first time slot, and operation 1210 which represents sending a second hybrid automatic repeat acknowledgement in each subsequent time slot based on the selected group of physical uplink control channel resource parameter values determined for the second time slot.

Creating the composite HARQ-ACK response may comprise multiplexing the HARQ-ACK data for the respective packets of the packet group. Creating the composite HARQ-ACK response may comprise bundling the HARQ-ACK data for the respective packets of the packet group. Creating the composite HARQ-ACK response may comprise, in response to determining the HARQ-ACK repetition factor is two, bundling the HARQ-ACK data for two most recent packets, or in response to determining the HARQ-ACK repetition factor is greater than two, multiplexing the HARQ-ACK data for the respective packets of the packet group.

Determining the selected group of physical uplink control channel resource parameter values can comprise obtaining information that indicates that subsequent transmissions are to be sent based on orthogonally different downlink shared channel parameter groups, and selecting a same downlink shared channel parameter group for the sending the first hybrid automatic repeat acknowledgement in the first time slot and for each hybrid automatic repeat acknowledgement to be sent according to the hybrid automatic repeat request acknowledgement repetition factor. Determining the selected group of physical uplink control channel resource parameter values can comprise selecting an orthogonally different downlink shared channel parameter group for the sending of each subsequent hybrid automatic repeat acknowledgement to be sent according to the hybrid automatic repeat request acknowledgement repetition factor. Selecting the orthogonally different downlink shared channel parameter group can comprise selecting the orthogonally different downlink shared channel parameter group that differs from another group in orthogonally-related parameter values, the orthogonally-related parameter values comprising at least one of a frequency parameter value, an orthogonal cover code parameter value, a different cyclic shift parameter value, a different spreading factor parameter value for an orthogonal cover code, a different frequency hopping parameter value.

As can be seen, the new radio coverage may be improved as the HARQ-ACK is repeated over multiple time intervals, however via orthogonality as described herein, the peak throughput remains same as the network can schedule the user equipment in consecutive time intervals.

Figure 13:
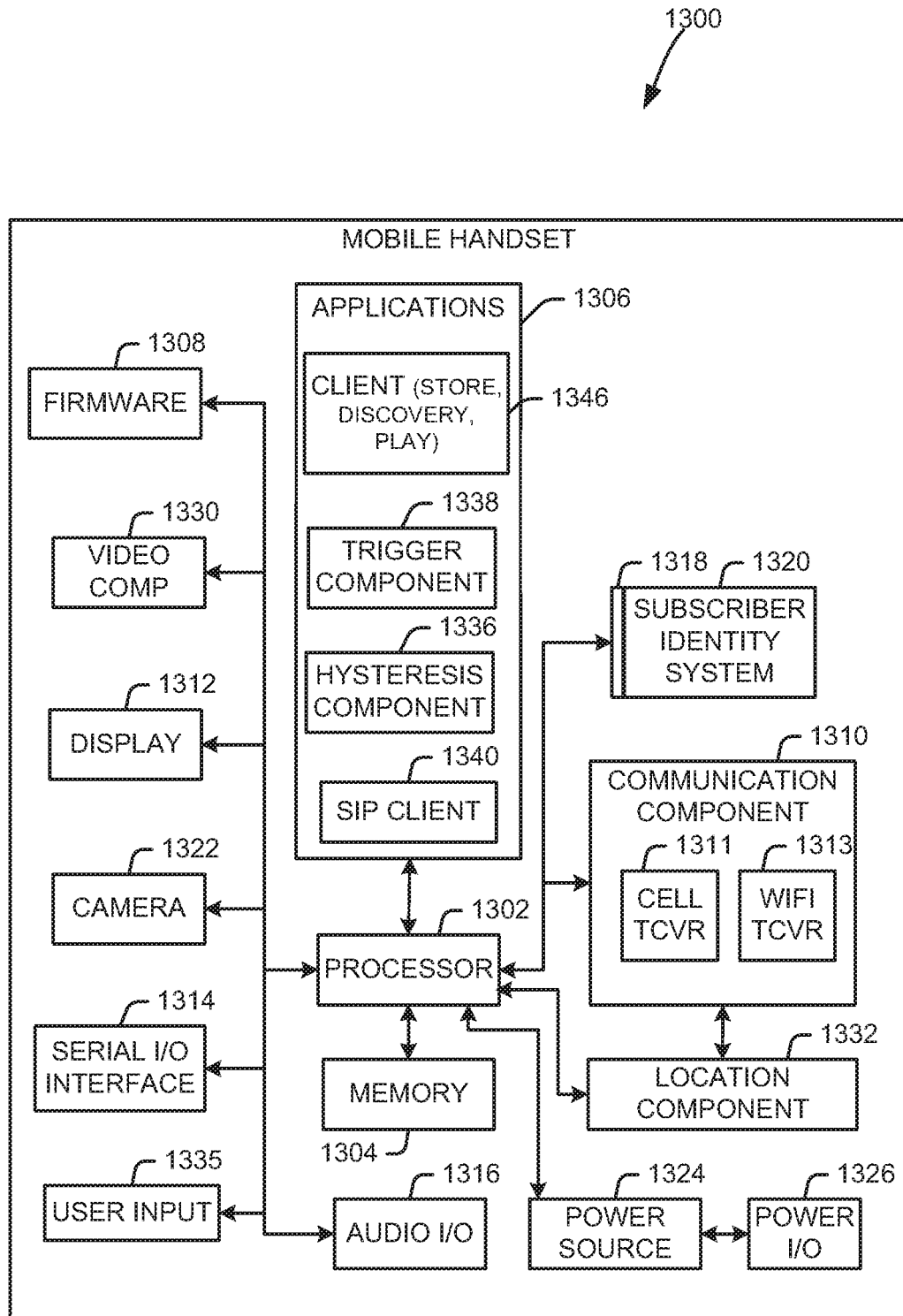
FIG. 13 illustrates an example block diagram of an example mobile handset operable to engage in a system architecture that facilitates wireless communications according to one or more embodiments described herein.

Referring now to FIG. 13, illustrated is an example block diagram of an example mobile handset 1300 operable to engage in a system architecture that facilitates wireless communications according to one or more embodiments described herein. Although a mobile handset is illustrated herein, it will be understood that other devices can be a mobile device, and that the mobile handset is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules, or other data. Computer storage media can include, but is not limited to, RAM, ROM, EEPROM, flash memory or other memory technology, solid state drive (SSD) or other solid-state storage technology, Compact Disk Read Only Memory (CD ROM), digital video disk (DVD), Blu-ray disk, or other optical disk storage, magnetic cassettes, magnetic tape, magnetic disk storage or other magnetic storage devices, or any other medium which can be used to store the desired information and which can be accessed by the computer. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Communication media typically embodies computer-readable instructions, data structures, program modules, or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media The handset includes a processor 1302 for controlling and processing all onboard operations and functions. A memory 1304 interfaces to the processor 1302 for storage of data and one or more applications 1306 (e.g., a video player software, user feedback component software, etc.). Other applications can include voice recognition of predetermined voice commands that facilitate initiation of the user feedback signals. The applications 1306 can be stored in the memory 1304 and/or in a firmware 1308, and executed by the processor 1302 from either or both the memory 1304 or/and the firmware 1308. The firmware 1308 can also store startup code for execution in initializing the handset 1300. A communications component 1310 interfaces to the processor 1302 to facilitate wired/wireless communication with external systems, e.g., cellular networks, VoIP networks, and so on. Here, the communications component 1310 can also include a suitable cellular transceiver 1311 (e.g., a GSM transceiver) and/or an unlicensed transceiver 1313 (e.g., Wi-Fi, WiMax) for corresponding signal communications. The handset 1300 can be a device such as a cellular telephone, a PDA with mobile communications capabilities, and messaging-centric devices. The communications component 1310 also facilitates communications reception from terrestrial radio networks (e.g., broadcast), digital satellite radio networks, and Internet-based radio services networks The handset 1300 includes a display 1312 for displaying text, images, video, telephony functions (e.g., a Caller ID function), setup functions, and for user input. For example, the display 1312 can also be referred to as a "screen" that can accommodate the presentation of multimedia content (e.g., music metadata, messages, wallpaper, graphics, etc.). The display 1312 can also display videos and can facilitate the generation, editing and sharing of video quotes. A serial I/O interface 1314 is provided in communication with the processor 1302 to facilitate wired and/or wireless serial communications (e.g., USB, and/or IEEE 1394) through a hardwire connection, and other serial input devices (e.g., a keyboard, keypad, and mouse). This supports updating and troubleshooting the handset 1300, for example. Audio capabilities are provided with an audio I/O component 1316, which can include a speaker for the output of audio signals related to, for example, indication that the user pressed the proper key or key combination to initiate the user feedback signal. The audio I/O component 1316 also facilitates the input of audio signals through a microphone to record data and/or telephony voice data, and for inputting voice signals for telephone conversations.

The handset 1300 can include a slot interface 1318 for accommodating a SIC (Subscriber Identity Component) in the form factor of a card Subscriber Identity Module (SIM) or universal SIM 1320, and interfacing the SIM card 1320 with the processor 1302. However, it is to be appreciated that the SIM card 1320 can be manufactured into the handset 1300, and updated by downloading data and software.

The handset 1300 can process IP data traffic through the communications component 1310 to accommodate IP traffic from an IP network such as, for example, the Internet, a corporate intranet, a home network, a person area network, etc., through an ISP or broadband cable provider. Thus, VoIP traffic can be utilized by the handset 1300 and IP-based multimedia content can be received in either an encoded or a decoded format.

A video processing component 1322 (e.g., a camera) can be provided for decoding encoded multimedia content. The video processing component 1322 can aid in facilitating the generation, editing, and sharing of video quotes. The handset 1300 also includes a power source 1324 in the form of batteries and/or an AC power subsystem, which power source 1324 can interface to an external power system or charging equipment (not shown) by a power I/O component 1326.

The handset 1300 can also include a video component 1330 for processing video content received and, for recording and transmitting video content. For example, the video component 1330 can facilitate the generation, editing and sharing of video quotes. A location tracking component 1332 facilitates geographically locating the handset 1300. As described hereinabove, this can occur when the user initiates the feedback signal automatically or manually. A user input component 1334 facilitates the user initiating the quality feedback signal. The user input component 1334 can also facilitate the generation, editing and sharing of video quotes. The user input component 1334 can include such conventional input device technologies such as a keypad, keyboard, mouse, stylus pen, and/or touch screen, for example.

Referring again to the applications 1306, a hysteresis component 1336 facilitates the analysis and processing of hysteresis data, which is utilized to determine when to associate with the access point. A software trigger component 1338 can be provided that facilitates triggering of the hysteresis component 1336 when the Wi-Fi transceiver 1313 detects the beacon of the access point. A SIP client 1340 enables the handset 1300 to support SIP protocols and register the subscriber with the SIP registrar server. The applications 1306 can also include a client 1342 that provides at least the capability of discovery, play and store of multimedia content, for example, music.

The handset 1300, as indicated above related to the communications component 1310, includes an indoor network radio transceiver 1313 (e.g., Wi-Fi transceiver). This function supports the indoor radio link, such as IEEE 802.11, for the dual-mode GSM handset 1300. The handset 1300 can accommodate at least satellite radio services through a handset that can combine wireless voice and digital radio chipsets into a single handheld device.

Figure 14:
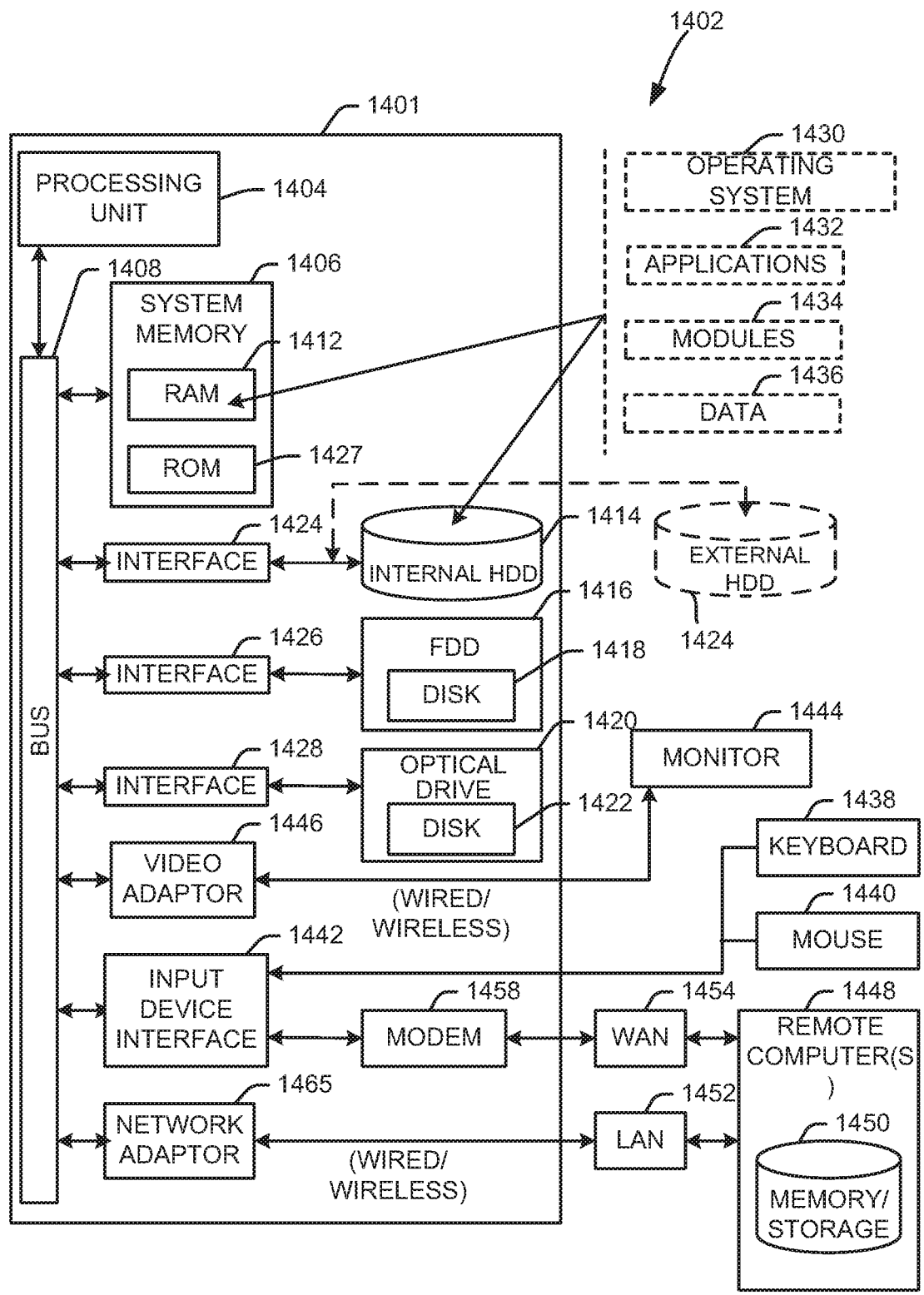
FIG. 14 illustrates an example block diagram of an example computer operable to engage in a system architecture that facilitates wireless communications according to one or more embodiments described herein.

Referring now to FIG. 14, illustrated is an example block diagram of an example computer 1400 operable to engage in a system architecture that facilitates wireless communications according to one or more embodiments described herein. The computer 1400 can provide networking and communication capabilities between a wired or wireless communication network and a server (e.g., Microsoft server) and/or communication device. In order to provide additional context for various aspects thereof, FIG. 14 and the following discussion are intended to provide a brief, general description of a suitable computing environment in which the various aspects of the innovation can be implemented to facilitate the establishment of a transaction between an entity and a third party. While the description above is in the general context of computer-executable instructions that can run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules, or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

The techniques described herein can be applied to any device or set of devices (machines) capable of running programs and processes. It can be understood, therefore, that servers including physical and/or virtual machines, personal computers, laptops, handheld, portable and other computing devices and computing objects of all kinds including cell phones, tablet/slate computers, gaming/entertainment consoles and the like are contemplated for use in connection with various implementations including those exemplified herein. Accordingly, the general purpose computing mechanism described below with reference to FIG. 14 is but one example of a computing device.

In order to provide a context for the various aspects of the disclosed subject matter, FIG. 14 and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules include routines, programs, components, data structures, etc. that perform particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory, by way of illustration, and not limitation, volatile memory 1420 (see below), non-volatile memory 1422 (see below), disk storage 1424 (see below), and memory storage 1446 (see below). Further, nonvolatile memory can be included in read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, including single-processor or multiprocessor computer systems, mini-computing devices, mainframe computers, as well as personal computers, hand-held computing devices (e.g., PDA, phone, watch, tablet computers, netbook computers, ... ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 14 illustrates a block diagram of a computing system 1400 operable to execute the disclosed systems and methods in accordance with an embodiment. Computer 1412, which can be, for example, part of the hardware of system 1420, includes a processing unit 1414, a system memory 1416, and a system bus 1418. System bus 1418 couples system components including, but not limited to, system memory 1416 to processing unit 1414. Processing unit 1414 can be any of various available processors. Dual microprocessors and other multiprocessor architectures also can be employed as processing unit 1414.

System bus 1418 can be any of several types of bus structure(s) including a memory bus or a memory controller, a peripheral bus or an external bus, and/or a local bus using any variety of available bus architectures including, but not limited to, Industrial Standard Architecture (ISA), Micro-Channel Architecture (MSA), Extended ISA (EISA), Intelligent Drive Electronics, VESA Local Bus (VLB), Peripheral Component Interconnect (PCI), Card Bus, Universal Serial Bus (USB), Advanced Graphics Port (AGP), Personal Computer Memory Card International Association bus (PC-MCIA), Firewire (IEEE 1494), and Small Computer Systems Interface (SCSI).

System memory 1416 can include volatile memory 1420 and nonvolatile memory 1422. A basic input/output system (BIOS), containing routines to transfer information between elements within computer 1412, such as during start-up, can be stored in nonvolatile memory 1422. By way of illustration, and not limitation, nonvolatile memory 1422 can include ROM, PROM, EPROM, EEPROM, or flash memory. Volatile memory 1420 includes RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1412 can also include removable/non-removable, volatile/non-volatile computer storage media. FIG. 14 illustrates, for example, disk storage 1424. Disk storage 1424 includes, but is not limited to, devices like a magnetic disk drive, floppy disk drive, tape drive, flash memory card, or memory stick. In addition, disk storage 1424 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1424 to system bus 1418, a removable or non-removable interface is typically used, such as interface 1426.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, random access memory (RAM), read only memory (ROM), electrically erasable programmable read only memory (EEPROM), flash memory or other memory technology, solid state drive (SSD) or other solid-state storage technology, compact disk read only memory (CD ROM), digital versatile disk (DVD), Blu-ray disc or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se. In an aspect, tangible media can include non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. For the avoidance of doubt, the term "computer-readable storage device" is used and defined herein to exclude transitory media. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

It can be noted that FIG. 14 describes software that acts as an intermediary between users and computer resources described in suitable operating environment 1400. Such software includes an operating system 1428. Operating system 1428, which can be stored on disk storage 1424, acts to control and allocate resources of computer system 1412. System applications 1430 take advantage of the management of resources by operating system 1428 through program modules 1432 and program data 1434 stored either in system memory 1416 or on disk storage 1424. It is to be noted that the disclosed subject matter can be implemented with various operating systems or combinations of operating systems.

A user can enter commands or information into computer 1412 through input device(s) 1436. As an example, a mobile device and/or portable device can include a user interface embodied in a touch sensitive display panel allowing a user to interact with computer 1412. Input devices 1436 include, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1414 through system bus 1418 by way of interface port(s) 1438. Interface port(s) 1438 include, for example, a serial port, a parallel port, a game port, a universal serial bus (USB), an infrared port, a Bluetooth port, an IP port, or a logical port associated with a wireless service, etc. Output device(s) 1440 and a move use some of the same type of ports as input device(s) 1436.

Thus, for example, a USB port can be used to provide input to computer 1412 and to output information from computer 1412 to an output device 1440. Output adapter 1442 is provided to illustrate that there are some output devices 1440 like monitors, speakers, and printers, among other output devices 1440, which use special adapters. Output adapters 1442 include, by way of illustration and not limitation, video and sound cards that provide means of connection between output device 1440 and system bus 1418. It should be noted that other devices and/or systems of devices provide both input and output capabilities such as remote computer(s) 1444.

Computer 1412 can operate in a networked environment using logical connections to one or more remote computers, such as remote computer(s) 1444. Remote computer(s) 1444 can be a personal computer, a server, a router, a network PC, cloud storage, cloud service, a workstation, a microprocessor based appliance, a peer device, or other common network node and the like, and typically includes many or all of the elements described relative to computer 1412.

For purposes of brevity, only a memory storage device 1446 is illustrated with remote computer(s) 1444. Remote computer(s) 1444 is logically connected to computer 1412 through a network interface 1448 and then physically connected by way of communication connection 1450. Network interface 1448 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit-switching networks like Integrated Services Digital Networks (ISDN) and variations thereon, packet switching networks, and Digital Subscriber Lines (DSL). As noted below, wireless technologies may be used in addition to or in place of the foregoing.

Communication connection(s) 1450 refer(s) to hardware/software employed to connect network interface 1448 to bus 1418. While communication connection 1450 is shown for illustrative clarity inside computer 1412, it can also be external to computer 1412. The hardware/software for connection to network interface 1448 can include, for example, internal and external technologies such as modems, including regular telephone grade modems, cable modems and DSL modems, ISDN adapters, and Ethernet cards.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media, device readable storage devices, or machine readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point (AP)," "base station," "NodeB," "evolved Node B (eNodeB)," "home Node B (HNB)," "home access point (HAP)," "cell device," "sector," "cell," and the like, are utilized interchangeably in the subject application, and refer to a wireless network component or appliance that serves and receives data, control, voice, video, sound, gaming, or substantially any data-stream or signaling-stream to and from a set of subscriber stations or provider enabled devices. Data and signaling streams can include packetized or frame-based flows.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. UEs do not normally connect directly to the core networks of a large service provider but can be routed to the core by way of a switch or radio area network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g. call transfer) or implicitly (e.g., call waiting). It is to be noted that service "execution" may or may not be a core network functionality as third party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks include Geocast technology; broadcast technologies (e.g., sub-Hz, ELF, VLF, LF, MF, HF, VHF, UHF, SHF, THz broadcasts, etc.); Ethernet; X.25; powerline-type networking (e.g., PowerLine AV Ethernet, etc.); femto-cell technology; Wi-Fi; Worldwide Interoperability for Microwave Access (WiMAX); Enhanced General Packet Radio Service (Enhanced GPRS); Third Generation Partnership Project (3GPP or 3G) Long Term Evolution (LTE); 3GPP Universal Mobile Telecommunications System (UMTS) or 3GPP UMTS; Third Generation Partnership Project 2 (3GPP2) Ultra Mobile Broadband (UMB); High Speed Packet Access (HSPA); High Speed Downlink Packet Access (HSDPA); High Speed Uplink Packet Access (HSUPA); GSM Enhanced Data Rates for GSM Evolution (EDGE) Radio Access Network (RAN) or GERAN; UMTS Terrestrial Radio Access Network (UTRAN); or LTE Advanced.

What has been described above includes examples of systems and methods illustrative of the disclosed subject matter. It is, of course, not possible to describe every combination of components or methods herein. One of ordinary skill in the art may recognize that many further combinations and permutations of the disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

While the various embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope of the various embodiments.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the embodiments are not to be limited to any single implementation, but rather is to be construed in breadth, spirit and scope in accordance with the appended claims.

What is claimed is:

1. A device, comprising:
a processor; and
a memory that stores executable instructions that, when executed by the processor, facilitate performance of operations, the operations comprising:
configuring a user equipment device to repeat hybrid automatic repeat request acknowledgements to be sent by the user equipment device via physical uplink control channel resources that are orthogonal to physical downlink shared channel resources with respect to overlapping transmission time slots; and
configuring the user equipment device to commence, in response to information transmitted by the device to the user equipment device, the repeating the hybrid automatic repeat request acknowledgements, resulting in repeated hybrid automatic repeat request acknowledgements using the physical uplink control channel resources, to reduce an interference between the physical uplink control channel resources and the physical downlink shared channel resources in a same time slot.

2. The device of claim 1, wherein the configuring the user equipment device to repeat the hybrid automatic repeat request acknowledgements comprises configuring the user equipment device to repeat the hybrid automatic repeat request acknowledgements according to a repetition factor, and wherein the operations further comprise facilitating transmitting, to the user equipment device, the repetition factor based on a distance of the user equipment device from the device.

3. The device of claim 1, wherein the configuring the user equipment device to repeat the hybrid automatic repeat request acknowledgements further comprises transmitting data corresponding to first downlink groups of physical shared channel resource parameters and first uplink groups of physical control channel resource parameters to the user equipment device, and wherein a quantity of the first downlink groups of physical shared channel resource parameters is at least as large as a number of times the user equipment device is configured to repeat the hybrid automatic repeat request acknowledgements.

4. The device of claim 3, wherein the repeated hybrid automatic repeat request acknowledgements are first repeated hybrid automatic repeat request acknowledgements, and wherein the information transmitted to the user equipment device on the physical downlink shared channel resources is first information, and wherein the operations further comprise:
facilitating transmitting second information from the device to the user equipment device in a first time slot of the transmission time slots based on the first downlink groups of physical shared channel resource parameters;
facilitating transmitting third information from the device to the user equipment device in a second, consecutive time slot of the transmission time slots based on a second downlink group of physical shared channel resource parameters orthogonal to the first downlink groups of physical shared channel resource parameters, wherein the configuring the user equipment device to repeat the first repeated hybrid automatic repeat request acknowledgements comprises instructing the user equipment device to use the first uplink groups of physical control channel resource parameters that correspond to the first downlink groups of physical shared channel resource parameters for the first repeated hybrid automatic repeat request acknowledgements in response to the first information being transmitted; and
instructing the user equipment device to use a second uplink group of physical control channel resource parameters for second repeated hybrid automatic repeat request acknowledgements in response to the third information being transmitted.

5. The device of claim 3, wherein the configuring the user equipment device to repeat the hybrid automatic repeat request acknowledgements comprises instructing the user equipment device to use a different uplink group of physical control channel resource parameters for the repeated hybrid automatic repeat request acknowledgements to be sent in response to a same transmission.

6. The device of claim 3, wherein the operations further comprise setting at least two of the first uplink groups of physical control channel resource parameters to comprise different frequency parameter values.

7. The device of claim 3, wherein the operations further comprise setting at least two of the first uplink groups of physical control channel resource parameters to comprise different time parameter values.

8. The device of claim 3, wherein the operations further comprise setting at least two of the first uplink groups of physical control channel resource parameters to comprise different orthogonal cover code parameter values.

9. The device of claim 3, wherein the operations further comprise setting at least two of the first uplink groups of physical control channel resource parameters to comprise different spreading factor parameter values for an orthogonal cover code.

10. The device of claim 3, wherein the operations further comprise configuring at least two of the first uplink groups of physical control channel resource parameters to comprise different frequency hopping parameter values.

11. The device of claim 3, wherein the operations further comprise configuring at least two of the first uplink groups of physical control channel resource parameters to comprise different cyclic shift parameter values.

12. A method, comprising:
obtaining, by a device comprising a processor, a repetition factor that is greater than one;
facilitating, by the device, receiving physical downlink shared channel transmissions; and
in response to receiving a first transmission of the physical downlink shared channel transmissions in a first time slot, sending, by the device, a number of hybrid automatic repeat request acknowledgements, according to the repetition factor using physical uplink control channel resources that are orthogonal to physical downlink shared channel resources with respect to overlapping transmission time slots to avoid interference between physical resource uplink control channel resources and the physical downlink shared channel resources in a same time slot.

13. The method of claim 12, further comprising obtaining, by the device, groups of configuration data corresponding to orthogonally different groups of physical uplink control channel resource parameter values, wherein the sending the number of hybrid automatic repeat request acknowledgements is based on selecting among the orthogonally different groups of physical uplink control channel resource parameter values.

14. The method of claim 13, wherein the repetition factor is at least two, and wherein the method further comprises, receiving, by the device, a second transmission of the physical downlink shared channel transmissions on a different, orthogonal physical downlink shared channel in a second time slot, and wherein the selecting among the orthogonally different groups of physical uplink control channel resource parameter values comprises using a first group of physical uplink control channel resource parameter values for sending of hybrid automatic repeat request acknowledgements for the first transmission, and using a second group of physical uplink control channel resource parameter values for the hybrid automatic repeat request acknowledgements for the second transmission.

15. The method of claim 13, wherein the repetition factor is at least two, and wherein the selecting among the orthogonally different groups of physical uplink control channel resource parameter values comprises using an orthogonally different group of physical uplink control channel resource parameter values for each hybrid automatic repeat request acknowledgement for sending of hybrid automatic repeat request acknowledgements for the first transmission.

16. The method of claim 13, wherein one of the groups of configuration data comprises a dataset, the dataset comprising at least one of: a first index of a first symbol, a number of orthogonal frequency division multiplex symbols, a second index of at least one first physical resource block associated with frequency hopping data indicating no frequency hopping, a number of physical resource blocks, the frequency hopping data indicating whether frequency hopping for the groups of physical uplink control channel resource parameter values is enabled or disabled, a third index representative of a cyclic shift, a fourth index of an orthogonal cover code, or a spreading factor for the orthogonal cover code.

17. The method of claim 13, wherein two groups of the groups of configuration data comprise an orthogonal parameter value difference between the two groups, the two groups comprising at least one of different frequency parameter values, different time parameter values, different orthogonal cover code parameter values, different cyclic shift parameter values, different spreading factor parameter values for an orthogonal cover code, or different frequency hopping parameter values.

18. A machine-readable storage medium, comprising executable instructions that, when executed by a processor of a user equipment device, facilitate performance of operations, the operations comprising:
receiving a physical downlink shared channel transmission; and
in response to the receiving the physical downlink shared channel transmission being in a first time slot, repeating hybrid automatic repeat request acknowledgements using physical resource uplink control channel resources that are orthogonal to physical downlink shared channel resources with respect to overlapping transmission time slots to avoid interference between the physical resource uplink control channel resources and the physical downlink shared channel resources in a same time slot.

19. The machine-readable storage medium of claim 18, wherein the operations further comprise receiving data corresponding to first groups of orthogonal physical downlink shared channel resources and second groups of orthogonal physical uplink control channel resources, and wherein a first number of the first groups of orthogonal physical downlink shared channel resources is at least as large as a second number of repetitions of the hybrid automatic repeat request acknowledgements.

20. The machine-readable storage medium of claim 19, wherein the repeating the hybrid automatic repeat request acknowledgements comprises using a different group of orthogonal physical uplink control channel resources for repeated hybrid automatic repeat request acknowledgements to be sent in response to a same transmission.

* * * * *